US009558153B2

(12) United States Patent
Howell et al.

(10) Patent No.: US 9,558,153 B2
(45) Date of Patent: Jan. 31, 2017

(54) MOULD MANUFACTURING CONTROL SYSTEM

(71) Applicant: MICHAEL WEINIG, INC., Mooresville, NC (US)

(72) Inventors: Jason F. Howell, Mooresville, NC (US); Steven McNeilly, Mooresville, NC (US); Daniel Dew, Mooresville, NC (US)

(73) Assignee: Michael Weinig, Inc., Mooresville, NC (US)

( * ) Notice: Subject to any disclaimer, the term of this patent is extended or adjusted under 35 U.S.C. 154(b) by 504 days.

(21) Appl. No.: 13/972,802

(22) Filed: Aug. 21, 2013

(65) Prior Publication Data

US 2014/0058549 A1   Feb. 27, 2014

Related U.S. Application Data

(60) Provisional application No. 61/691,769, filed on Aug. 21, 2012.

(51) Int. Cl.
*G06F 17/00* (2006.01)
*G06F 3/12* (2006.01)
(Continued)

(52) U.S. Cl.
CPC ......... *G06F 17/00* (2013.01); *G05B 19/41835* (2013.01); *G06F 3/126* (2013.01);
(Continued)

(58) Field of Classification Search
CPC .. G06Q 10/10; G06Q 10/087; G06Q 30/0603; G06Q 30/0621; G06F 17/50; G06F 3/126; B42C 19/00; B42P 2261/04; Y10S 707/99945; Y10S 707/99948
See application file for complete search history.

(56) References Cited

U.S. PATENT DOCUMENTS 7,016,865 B1 *  3/2006  Weber .................... G06Q 30/00
                                                                    705/26.5
7,072,733 B2 *  7/2006  Magee ............... D06B 11/0059
                                                                    700/133

(Continued)

FOREIGN PATENT DOCUMENTS

IE    WO 2007096851 A1 *  8/2007  ............. B42C 19/00
IE       GB 2435702 A  *  9/2007  ......... G06Q 30/0603

*Primary Examiner* — Crystal J Barnes-Bullock
(74) *Attorney, Agent, or Firm* — Moore & Van Allen PLLC; Patrick B. Horne

(57) ABSTRACT

Embodiments of the invention provide methods, systems, computer programs and the like that provide for mould manufacturing control. Embodiments of the invention employ management communication and integration amongst a plurality of devices or process stations included in a lineal moulding manufacturing process. Once customer orders are received, the orders are analyzed by a manufacturing application server and used to create job instructions for producing the one or more orders. The job instructions are then transmitted to one or more production device(s). The production devices execute the job instructions and report back to the server. The server maintains status information for any jobs being performed and can provide real time information regarding the jobs to any of the production devices.

24 Claims, 26 Drawing Sheets

(51) Int. Cl.
*G06Q 10/08* (2012.01)
*G06Q 30/06* (2012.01)
*G05B 19/418* (2006.01)

(52) U.S. Cl.
CPC ....... G06Q 10/087 (2013.01); G06Q 30/0621 (2013.01); *G05B 2219/45204* (2013.01); *Y02P 90/12* (2015.11); *Y02P 90/18* (2015.11)

(56) References Cited

U.S. PATENT DOCUMENTS

| | | | | |
|---|---|---|---|---|
| 7,079,273 | B2* | 7/2006 | Sato | G06Q 10/10 358/1.15 |
| 7,509,271 | B2* | 3/2009 | Uchimi | G06Q 10/087 705/26.61 |
| 8,248,625 | B2* | 8/2012 | Paskalev | G06F 3/1217 358/1.13 |
| 8,676,658 | B2* | 3/2014 | Marcus | G06Q 30/0603 705/17 |
| 2003/0145010 | A1* | 7/2003 | Chiu | G06Q 10/087 |
| 2006/0271219 | A1* | 11/2006 | Lopez | G06F 17/50 700/97 |
| 2011/0225031 | A1* | 9/2011 | Park | G06Q 30/0224 705/14.25 |
| 2014/0297357 | A1* | 10/2014 | Zeng | G06Q 10/06 705/7.26 |

\* cited by examiner

CREATE YOUR QUOTATIONS WITH SOFTWARE:

- ALL THE INFORMATION REPRESENTING EACH MOULDING FOR EACH CUSTOMER IS ENTERED ONLY ONCE DURING THE QUOTATION, ORDER, AND MANUFACTURING PROCESS. ( A COMPLETE PAPER FREE PROCESS) WITHOUT DUPLICATING INFORMATION, THIS REDUCES THE CHANCE OF HUMAN ERROR.

THE ORDERS / JOB LIST, ARE TRANSFERRED DIRECTLY TO THE TOOL ROOM VIA SOFTWARE:

- IN THE TOOL ROOM:
  - KNOW WHAT JOBS ARE NEEDED, AND WHEN
  - PRINT A LIST OF TOOLS THAT ARE NEEDED FOR THE DAYS PRODUCTION
  - KNOW WHAT KNIVES YOU HAVE, AND WHAT KNIVES ARE NEW FROM THIS LIST

ORCHESTRATE THE COMPLETE MANUFACTURING PROCESS WITH SOFTWARE:

- PULL AND RIP MULTIPLE ORDERS OF THE SAME SPECIES INTO ONE BATCH TO PRODUCE BETTER YIELD
  - THE RIP SAW INFEED IS DIRECTED TO KNOW QUANTITY AND SIZE OF EACH PROFILE.
  - THE MOVING BLADES ON THE RIP SAW ARE MOVED INTO THE BEST SOLUTION FOR EACH BOARD
  - IT WILL STOP RIPPING WHEN IT HAS FINISHED THE CUT-LIST
    (THE OPERATOR CAN CONCENTRATE ON LOOKING FOR MATERIAL DEFECTS)
  - WITH THE INK-JET PRINTER LOCATED AT THE OUTFEED OF THE RIP SAW, THE MOVING PRINTER HEADS ADJUST ALONG WITH THE SAW BLADES SO IT CAN PRINT THE PROFILE NAME, SIZE, AND CUSTOMER NAME ON EACH STRIP. EACH RIPPED STRIP IS NOW DEDICATED TO THE MOULDING AND CUSTOMER IT WAS ORDERED FOR.

MOULDERS CHANGE FROM ONE PROFILE TO THE NEXT WITH EASE:

- QUICK CHANGE MOULDERS RECEIVE THE TOOLING AND MATERIAL AT THE SAME TIME:
  - PRODUCTION AT THE MOULDER IS LIKE CLOCK-WORK.
  - THE MATERIAL AND TOOLING IS READY AND AT THE MOULDER.
  - THE JOB INFORMATION HAS BEEN CREATED IN AND IS TRANSFERRED TO THE SET-UP PROGRAM ON THE MOULDER.
  - AFTER THE PROFILE HAS BEEN RUN, AND ALL CUT-BACKS HAVE BEEN ACCOUNTED FOR, A TRUE TALLY CAN BE CREATED AND COMPARED TO THE ORIGINAL ORDER USING A TOUCH SCREEN WITH THE SOFTWARE LOCATED AT THE OUT-FEED OF THE MOULDER.
  - PACKING SLIPS ARE PRINTED FROM THIS SOFTWARE, AND THE ACCOUNTING OFFICE CAN VIEW THE PACKING LIST AND CREATE AN INVOICE FOR THE CUSTOMER.

NO MATERIAL STAGING OR PAPER WORK.

MAKE WHAT YOU WANT AND WHEN YOU NEED IT!

PURCHASE THIS COMPLETE CELL, OR BUILD YOUR SHOP ONE STEP AT A TIME

FIG. 24

EASILY AND ACCURATELY QUOTE CUSTOMERS

DO YOU KNOW WHAT YOUR COST PER ORDER ARE? HOW ABOUT YOUR MARGINS?

- BROWSE AND IMPORT PROFILE SETUP INFORMATION FROM ONLINE CATALOG DIRECTLY INTO YOUR COMPANY'S CATALOG WITH THE CLICK OF A BUTTON.
- EASILY AND ACCURATELY GENERATE AND ADD IN KNIFE GRINDING CHARGES FOR NEW PROFILES.
- QUOTE AND ORDER KNIVES FROM GRINDING SERVICES DIRECTLY THROUGH THIS SOFTWARE.

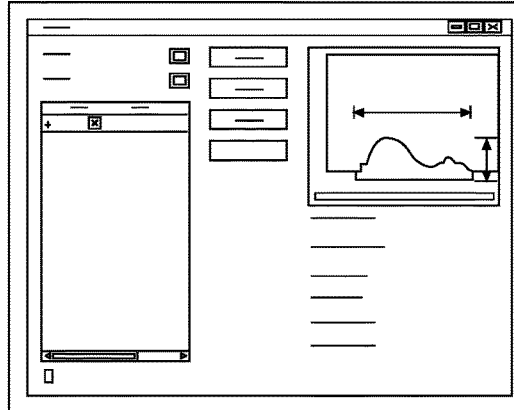

BE COMPETITIVE BY KNOWING YOUR MARGINS:

- STORE MATERIAL COST, LABOR RATES, AND PRODUCTION RATES FOR USE IN THE QUOTING PROCESS.
- CHOOSE PROFIT PERCENTAGES AND DISCOUNTS PER ORDER.
- KNOW EXACTLY WHAT YOUR MARGINS ARE.

INTUITIVE AND FLEXIBLE:

- INPORT YOUR EXISTING CONTACT AND PROFILE INFORMATON FOR QUICK START UP.
- AUTOMATICALLY POST ORDERS TO A COMPANY-WIDE CALENDAR TO ASSIST IN PRODUCTION SCHEDULING.
- USE AS A STAND-ALONE ORDER ENTRY SYSTEM OR, LINK IT TO YOUR SHOP FLOOR.

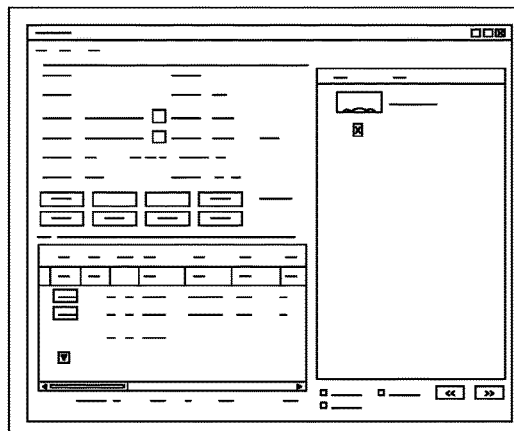

*FIG. 26*

MOULD MANUFACTURING CONTROL SYSTEM

BENEFIT CLAIM UNDER 35 U.S.C. §119

This Non-provisional Patent Application claims the benefit of U.S. Provisional Patent Application Ser. No. 61/691,769 filed Aug. 21, 2012, entitled "MOULD MANUFACTURING CONTROL SYSTEM", which is assigned to the assignee hereof and hereby expressly incorporated by reference herein.

BACKGROUND

Component manufacturing, such as solid wood manufacturing or processing is used to create products such as wooden moulding used in many applications including in furniture, trimmings for homes, design elements and the like. Traditionally, the manufacturing of moulding, for example, involves a rip saw that cuts wood into desired sizes and a moulding machine that cuts a desired profile to complete the moulding. This process can be difficult to manage in an efficient way because machine operators are prone to make mistakes. This causes the overall production to be affected by human error. Human error can occur in every facet of production from the management to the facilitation of a manufacturing process. Companies must employ people to manually inspect work orders and determine what is necessary to produce each individual order, including evaluating what wood species are needed for the multiple orders. This further involves creating routing sheets for a plurality of departments to execute a specific step in each order. The task at hand is cumbersome and time consuming. Moreover it is difficult for operators to keep track of more than a small number of orders. Likewise, if a change is made to an order several workers are each tasked with rearranging the queue of orders, possibly affecting many steps in the manufacturing process. As such this prevents manufacturers from optimizing the usage of their resources as one or several people may spend hours trying to complete such a task. In general, the reliance on manual labor and paper processes significantly limits efficiency in the course of production.

BRIEF SUMMARY

An application server may function as a central communication point for controlling the lineal moulding process and the production devices involved in the process, such as an inventory station, a ripsaw, a tool room and/or grinder, and a moulder.

According to embodiments of the invention, a system for integrating processes used in the manufacturing of lineal moulding includes a plurality of production devices that each perform at least one manufacturing process; a user computing device having a user interface to receive one or more customer orders; and a manufacturing application server operably connected to the plurality of production devices and the user computing device. The manufacturing application server includes a memory device storing computer executable code; and a processing device to execute the computer executable code to cause the processing device to determine job instructions for at least one job, the job instructions based at least in part on the one or more received customer orders; and transfer some or all the job instructions to at least one of the plurality of production devices; where the plurality of production devices execute the job instructions to complete the at least one job.

In some embodiments, the user computing device user interface receives order information, the order information associated with the one or more customer orders and communicates some or all the order information to the manufacturing application server. In some such embodiments, the user computing device receives priority rankings for each of the one or more customer orders and communicates some or all the priority rankings to the manufacturing application server. In other such embodiments, the manufacturing application server processing device executes the computer executable code to cause the processing device to identify batches associated with the one or more customer orders; and determine a production plan based at least in part on the order information, wherein the production plan optimizes yield potential of manufacturing materials.

In some embodiments, the job instructions are based at least in part on a production plan based at least in part on the order information and that optimizes yield potential of manufacturing materials.

In some embodiments, the production devices execute one or more processes in the manufacturing of lineal moulding based at least in part on the job instructions; and communicate job execution information to the manufacturing application server. In some such embodiments, one of the production devices communicates a query to the manufacturing application server requesting a status update regarding one or more jobs; and the manufacturing application server processing device executes the computer executable code to cause the processing device to receive the job execution information communicated from the plurality of production devices; determine a status of the one or more jobs associated with the query based on the job execution information; and communicate the status to the production device that communicated the query.

In some embodiments, the plurality product devices comprise an inventory station, a ripsaw, tool room or grinder, and a moulder.

According to embodiments of the invention, a computer program product configured for integrating processes used in the manufacturing of lineal moulding, the computer program product comprising a non-transitory computer readable medium having computer executable code stored thereon to cause a processing device to receive one or more customer orders; determine job instructions for at least one job, the job instructions based at least in part on the one or more received customer orders; and transfer some or all the job instructions to at least one of a plurality of production devices, wherein the plurality of production devices execute the job instructions to complete the at least one job.

In some embodiments, the computer executable code further causes the processing device to receive order information, the order information associated with the one or more customer orders and communicate some or all the order information to the manufacturing application server. In some embodiments, the computer executable code further causes the processing device to receive priority rankings for each of the one or more customer orders and communicate some or all the priority rankings to the manufacturing application server. In some embodiments, the computer executable code further causes the processing device to identify batches associated with the one or more customer orders; and determine a production plan based at least in part on the order information, wherein the production plan optimizes yield potential of manufacturing materials. In some embodiments, the job instructions are based at least in part on a production plan based at least in part on the order information and that optimizes yield potential of manufacturing materials.

In some embodiments, at least one production device executes one or more processes in the manufacturing of lineal moulding based at least in part on the job instructions and communicates job execution information to a manufacturing application server. In some such embodiments, one of the production devices communicates a query to the manufacturing application server requesting a status update regarding one or more jobs; and wherein the computer executable code further causes the processing device to receive the job execution information communicated from the one or more production devices; determine a status of the one or more jobs associated with the query based on the job execution information; and communicate the status to the production device that communicated the query.

According to embodiments of the invention, a method for integrating processes used in the manufacturing of lineal moulding includes receiving, by a user interface of a user computing device, one or more customer orders; a manufacturing application server operably connected to the a plurality of production devices and the user computer device, the manufacturing application server comprising a memory device storing computer executable code; and a processing device to execute the computer executable code to cause the processing device to determine job instructions for at least one job, the job instructions based at least in part on the one or more received customer orders; and transfer some or all the job instructions to at least one of the production devices so that the at least one job can be executed.

In some embodiments, the method includes receiving order information, the order information associated with the one or more customer orders and communicating some or all the order information to the manufacturing application server. In some embodiments, the method includes receiving, by the user computing device, priority rankings for each of the one or more customer orders and communicating, by the user computing device, some or all the priority rankings to the manufacturing application server. In some embodiments, the method includes identifying, by the manufacturing application server, batches associated with the one or more orders; and determining, by the manufacturing application server, a production plan based at least in part on the order information, wherein the production plan optimizes yield potential of manufacturing materials. In some embodiments, the job instructions are based at least in part on a production plan based at least in part on the order information and that optimizes yield potential of manufacturing materials; and the method further includes executing, by the one or more production devices, one or more processes in the manufacturing of lineal moulding based at least in part on the job instructions; communicating, by the one or more production devices, job execution information to the manufacturing application server; communicating, by one of the one or more production devices, a query to the manufacturing application server requesting a status update regarding one or more jobs; receiving, by the manufacturing application server, the job execution information communicated from the production devices; determining, by the manufacturing application server, a status of the one or more jobs associated with the query based on the job execution information; and communicating, by the manufacturing application server to the production device that communicated the query, the status regarding the one or more jobs.

BRIEF DESCRIPTION OF THE DRAWINGS

Figure 1:
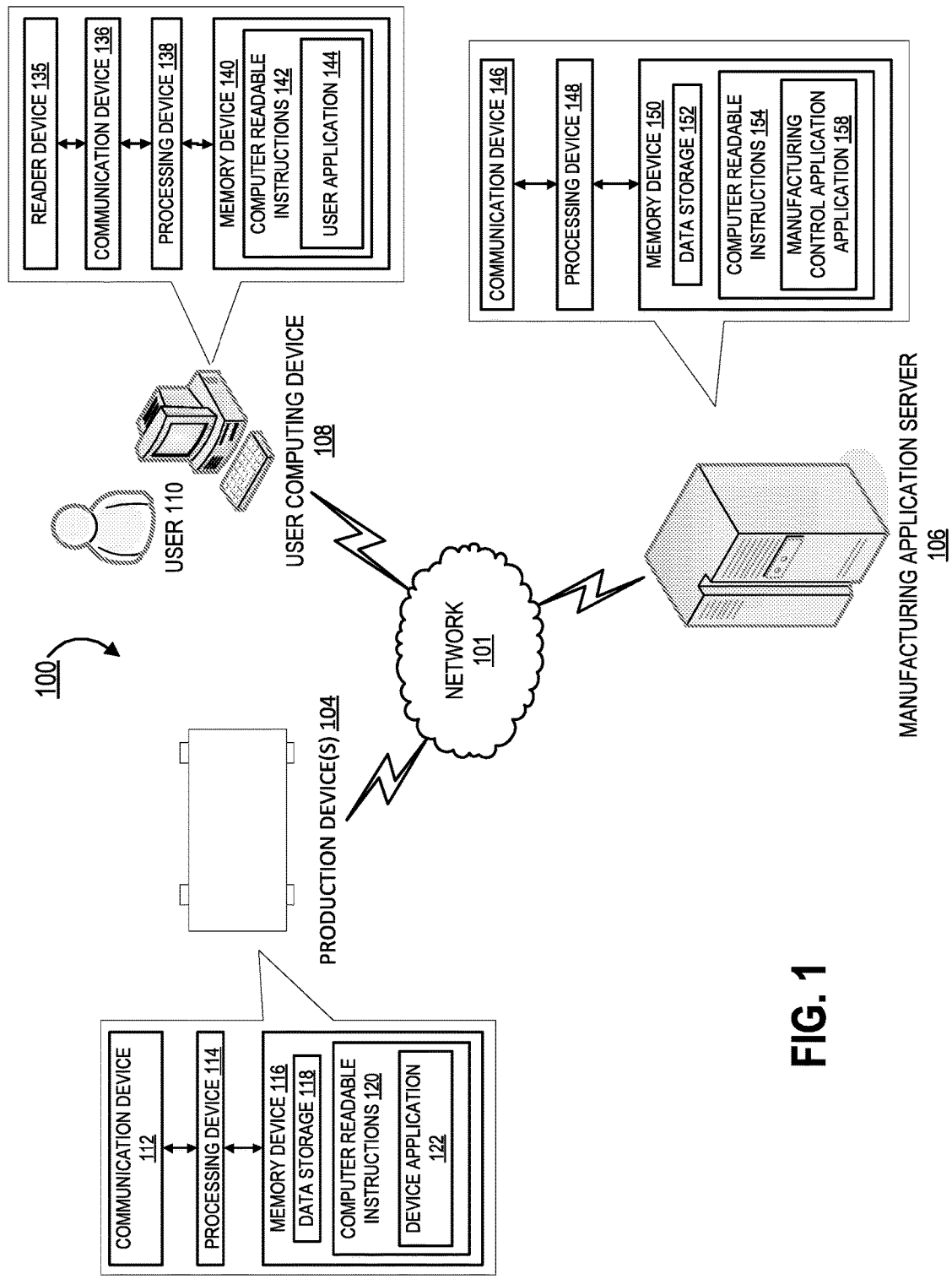
Figure 2:
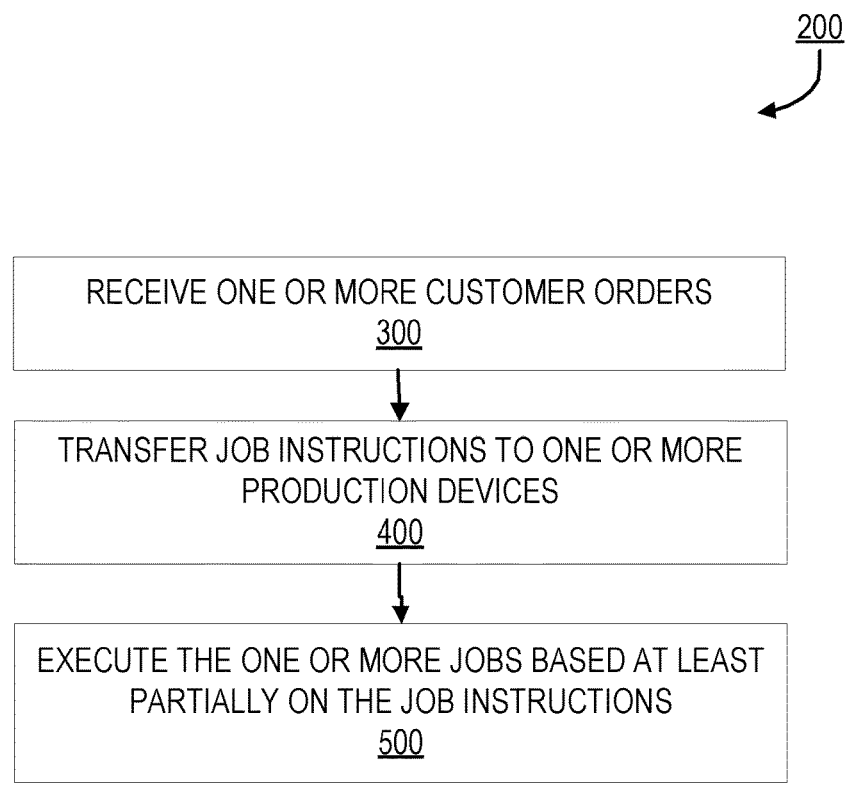
Figure 3:
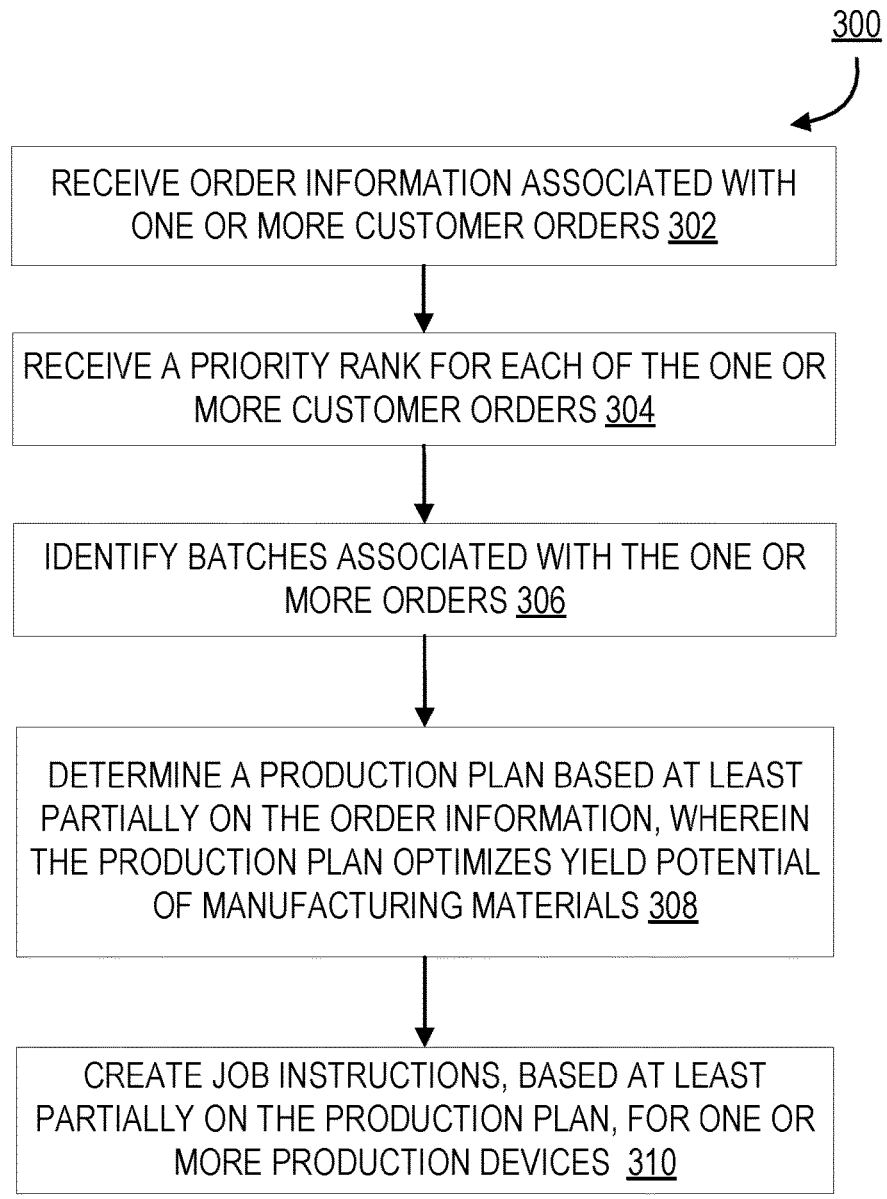
Figure 4:
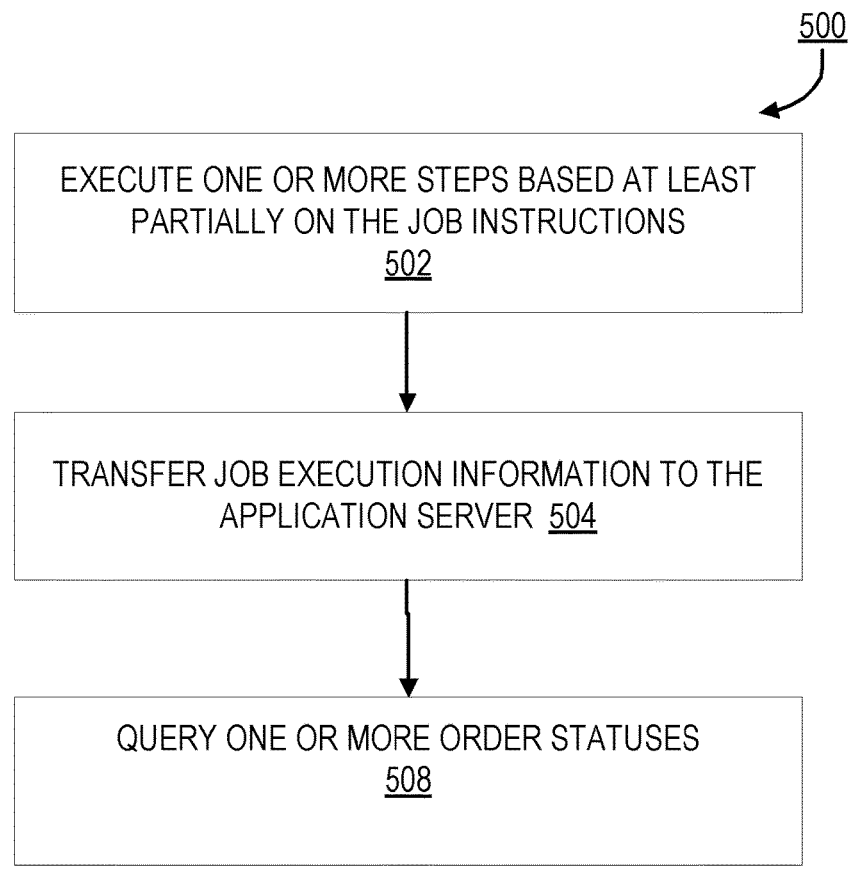
Figure 5:
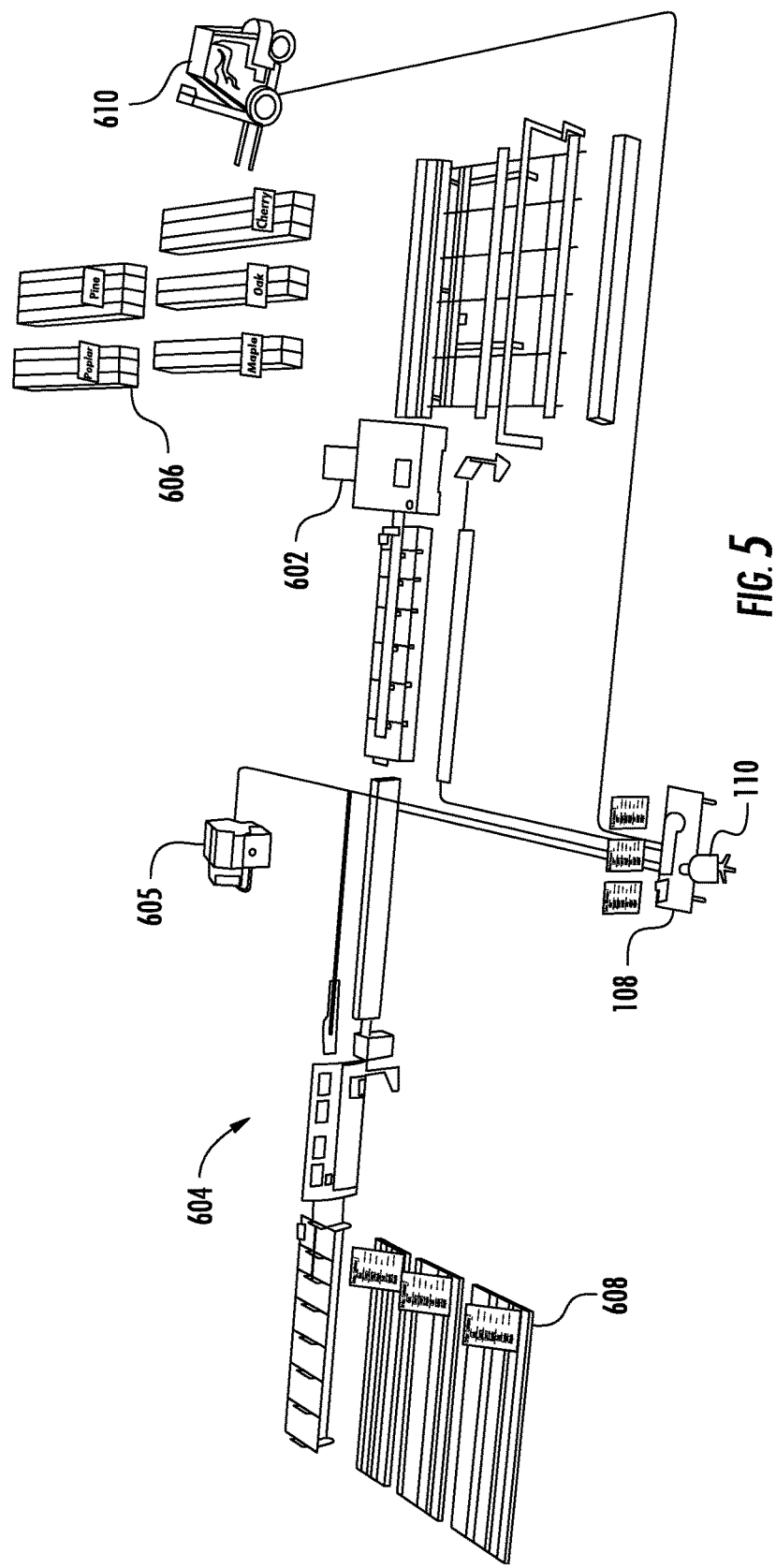
Figure 6:
Figure 7:
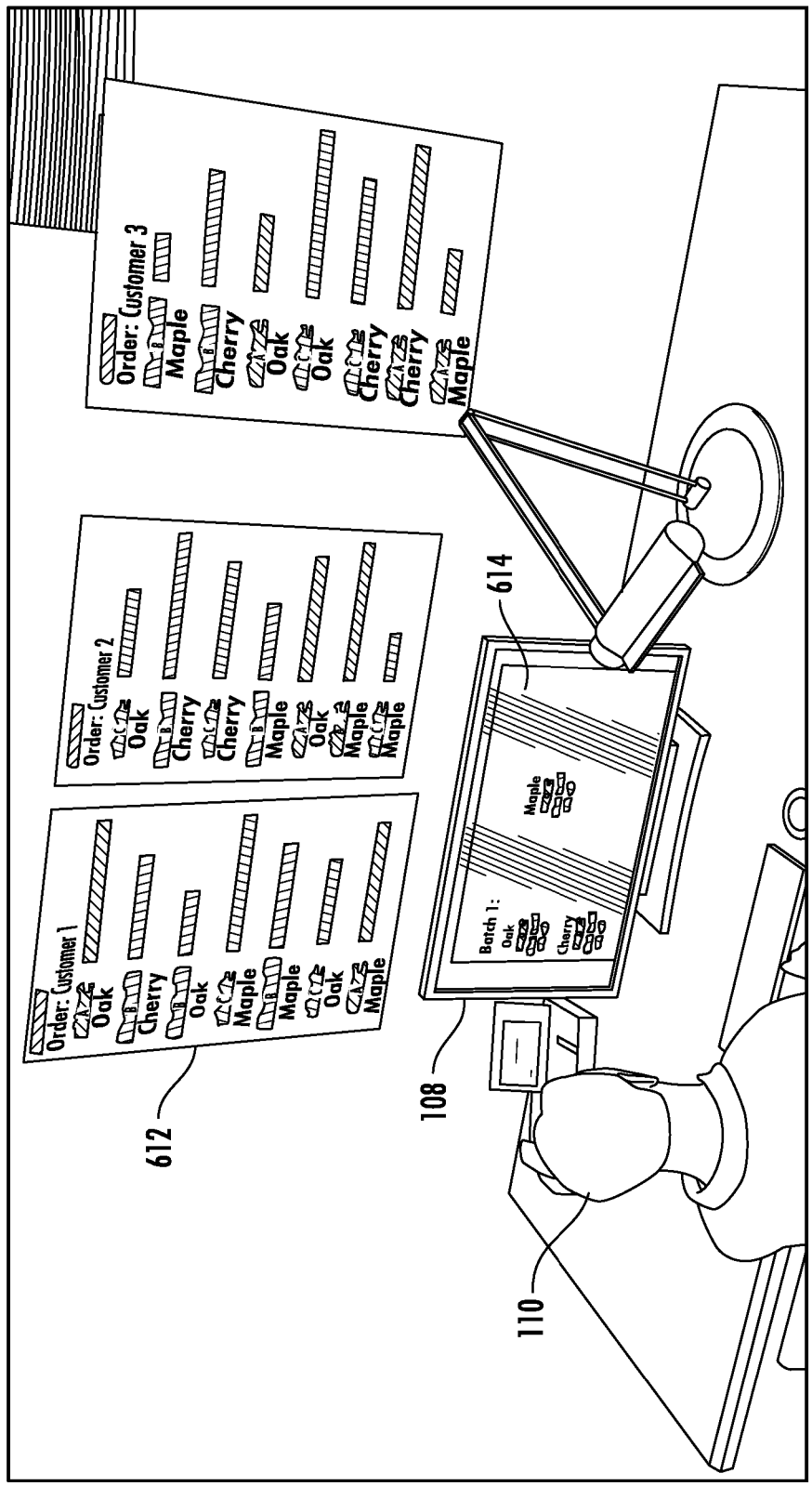
Figure 8:
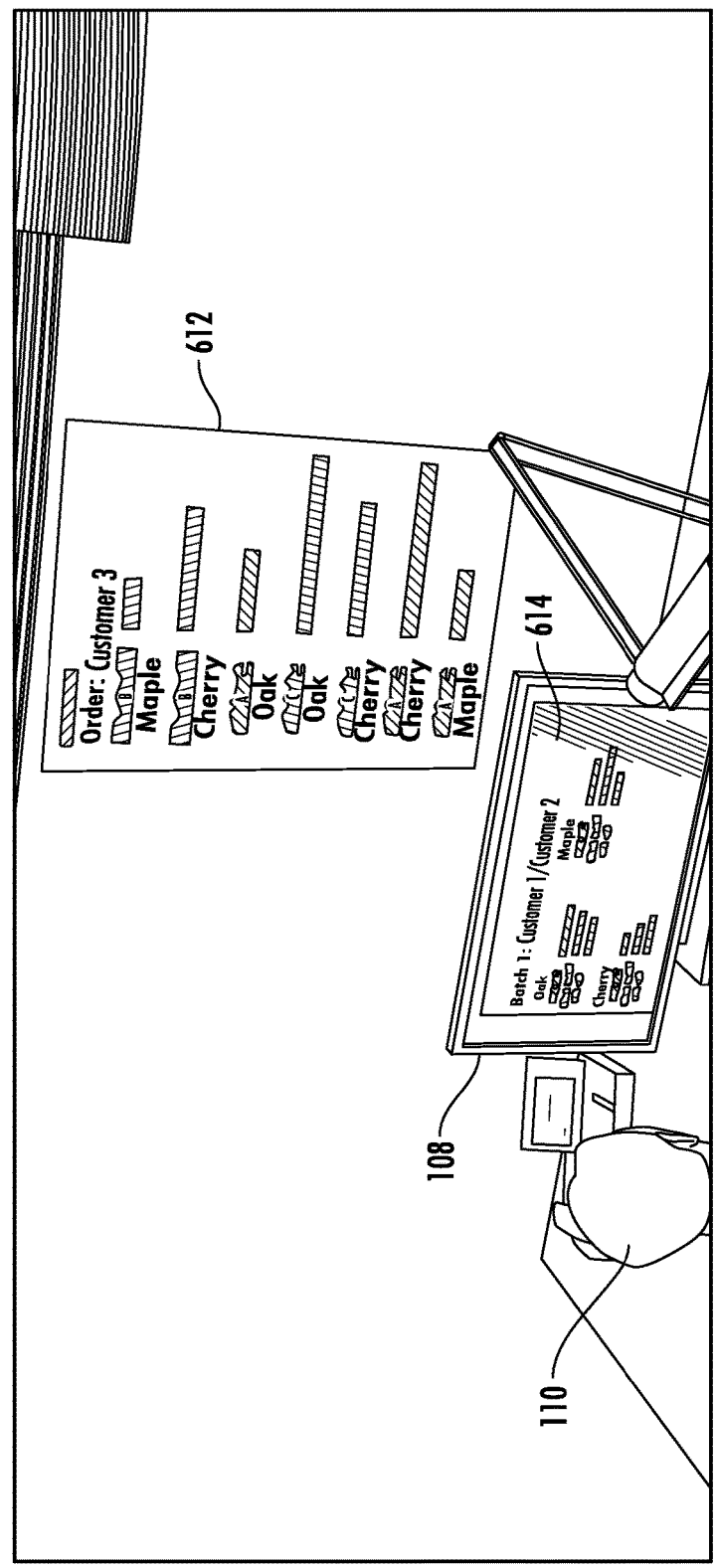
Figure 9:
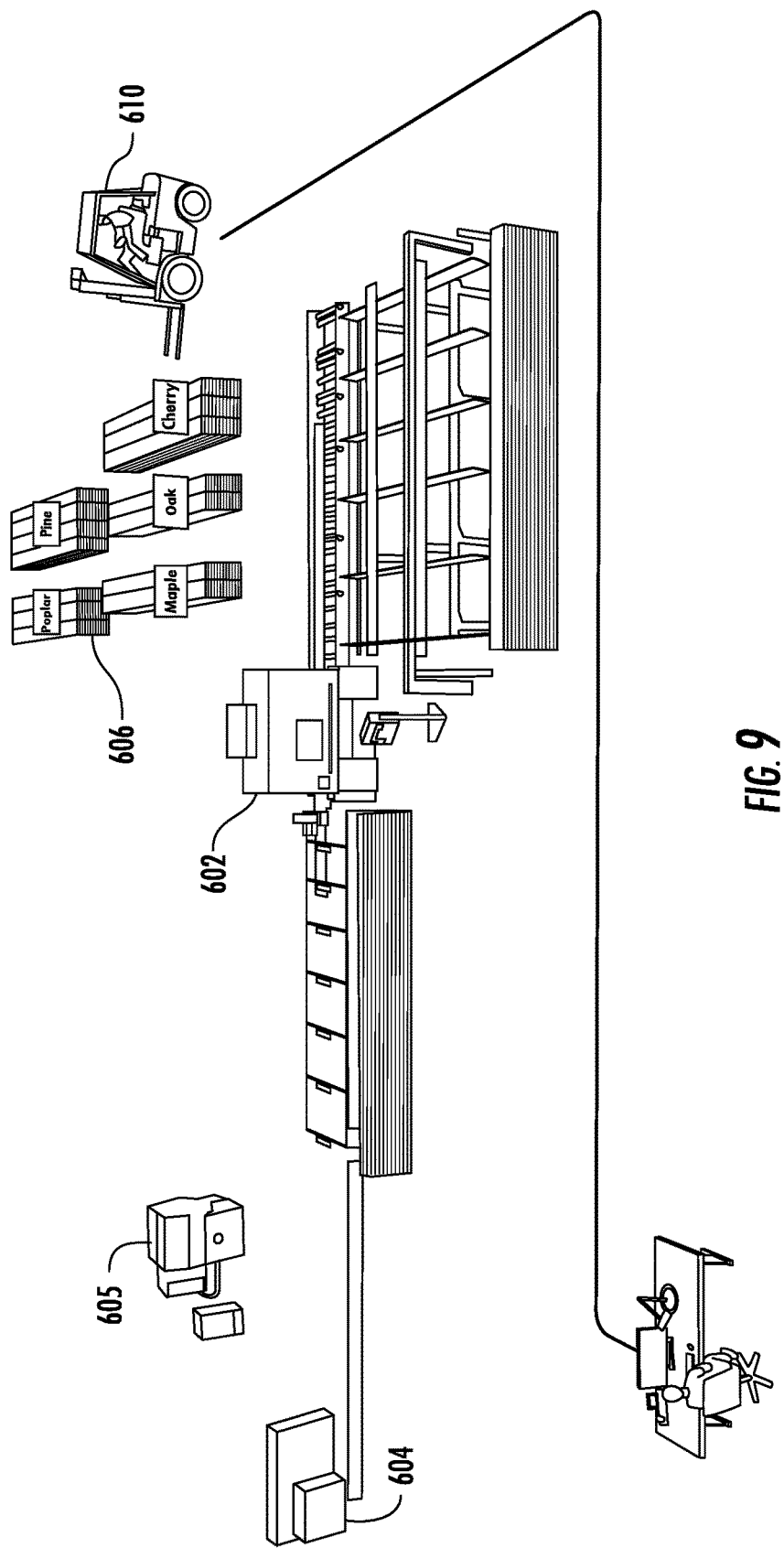
Figure 10:
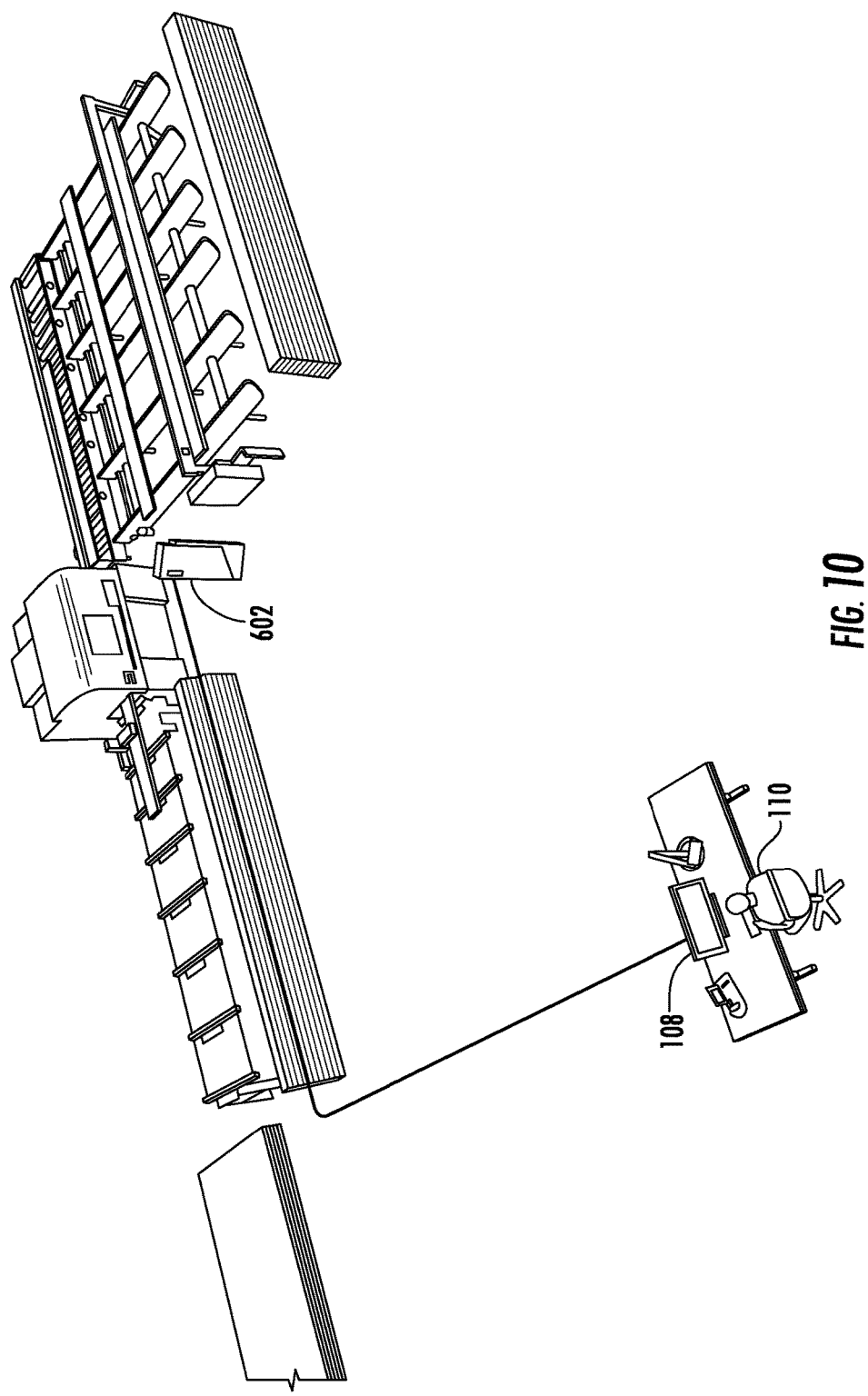
Figure 11:
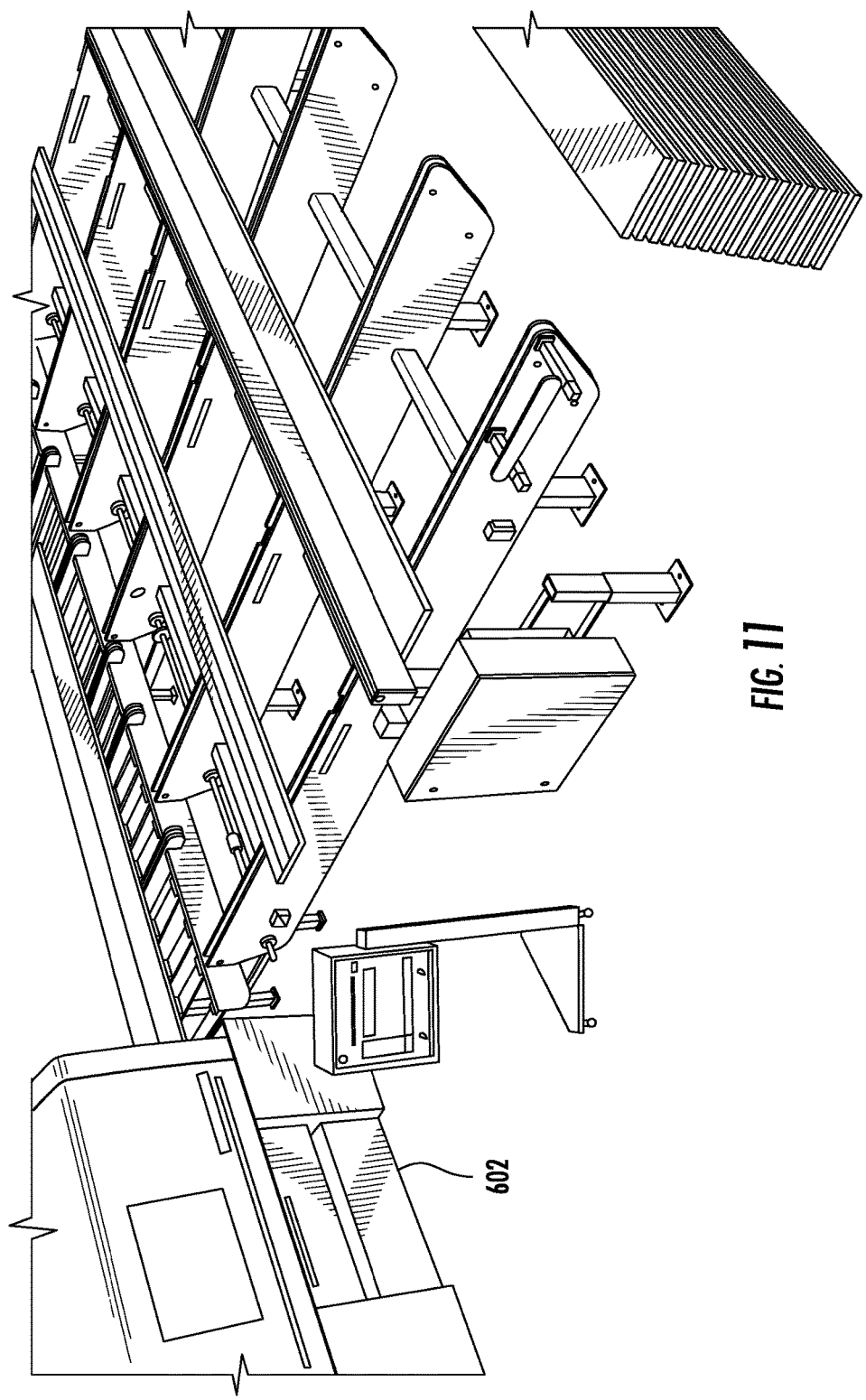
Figure 12:
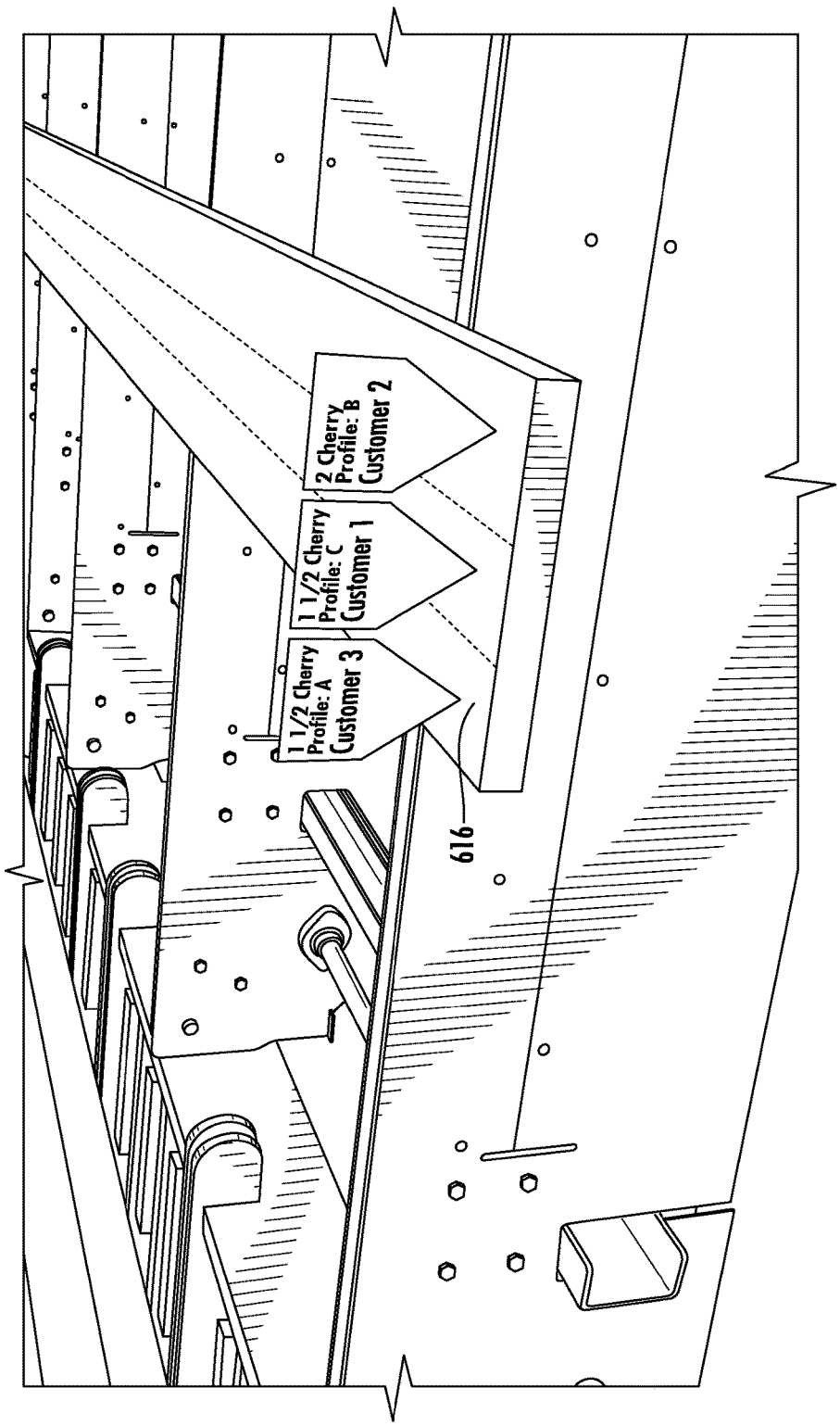
Figure 13:
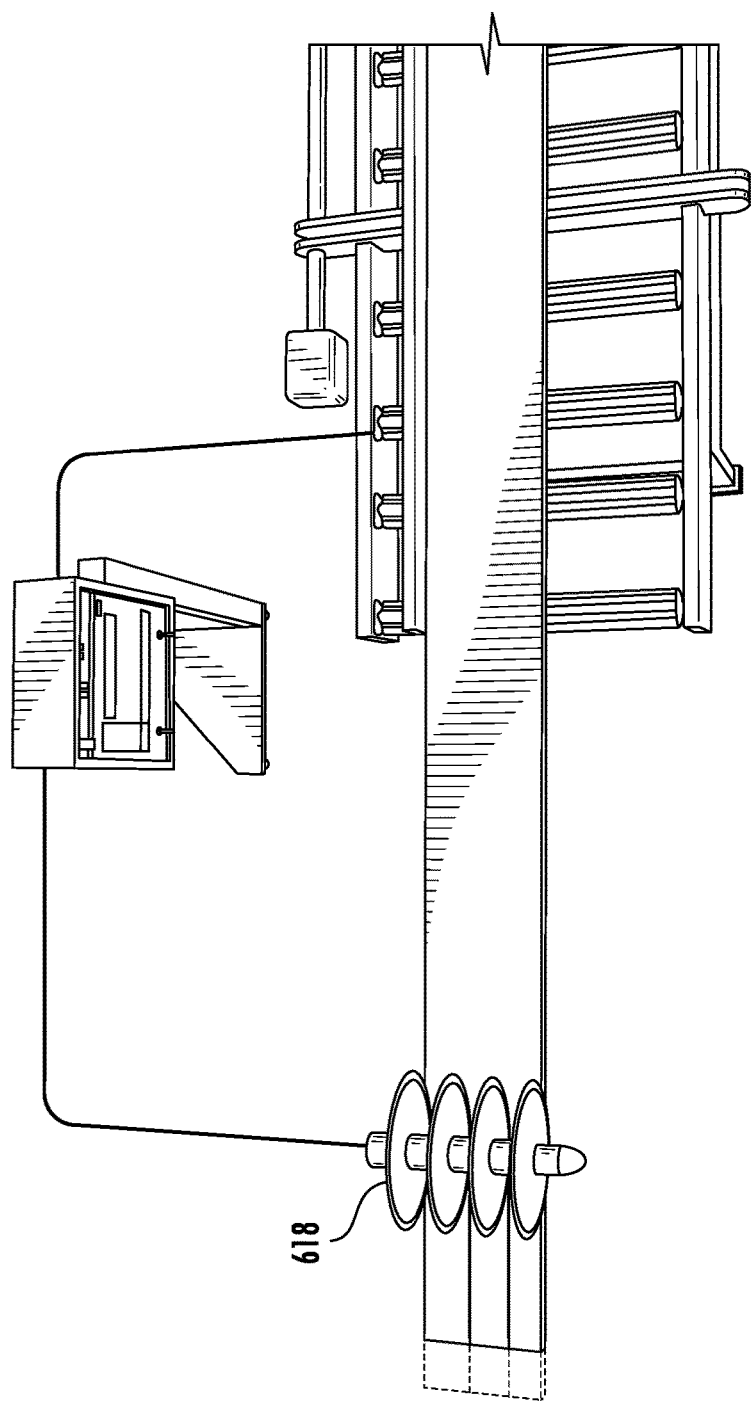
Figure 14:
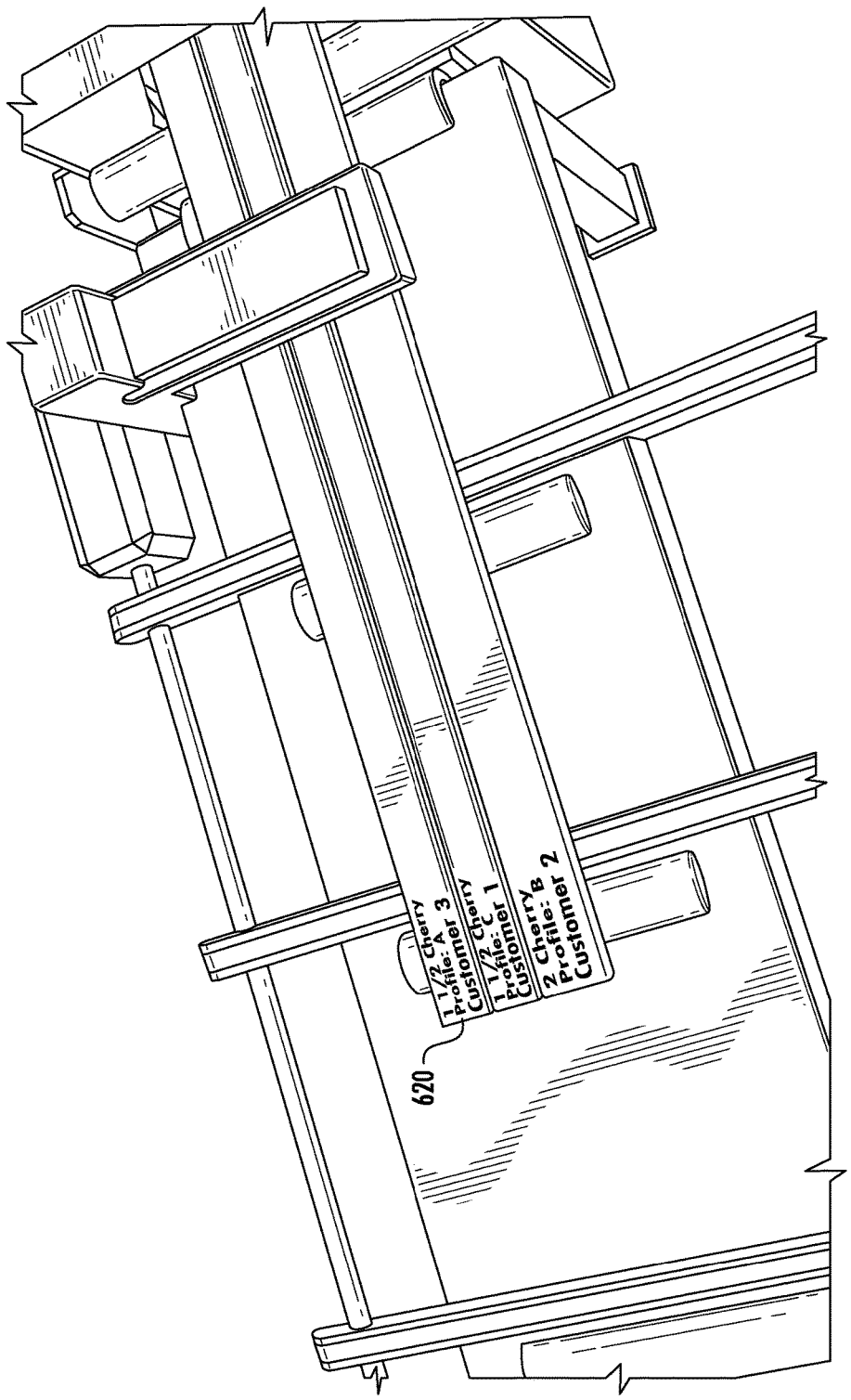
Figure 15:
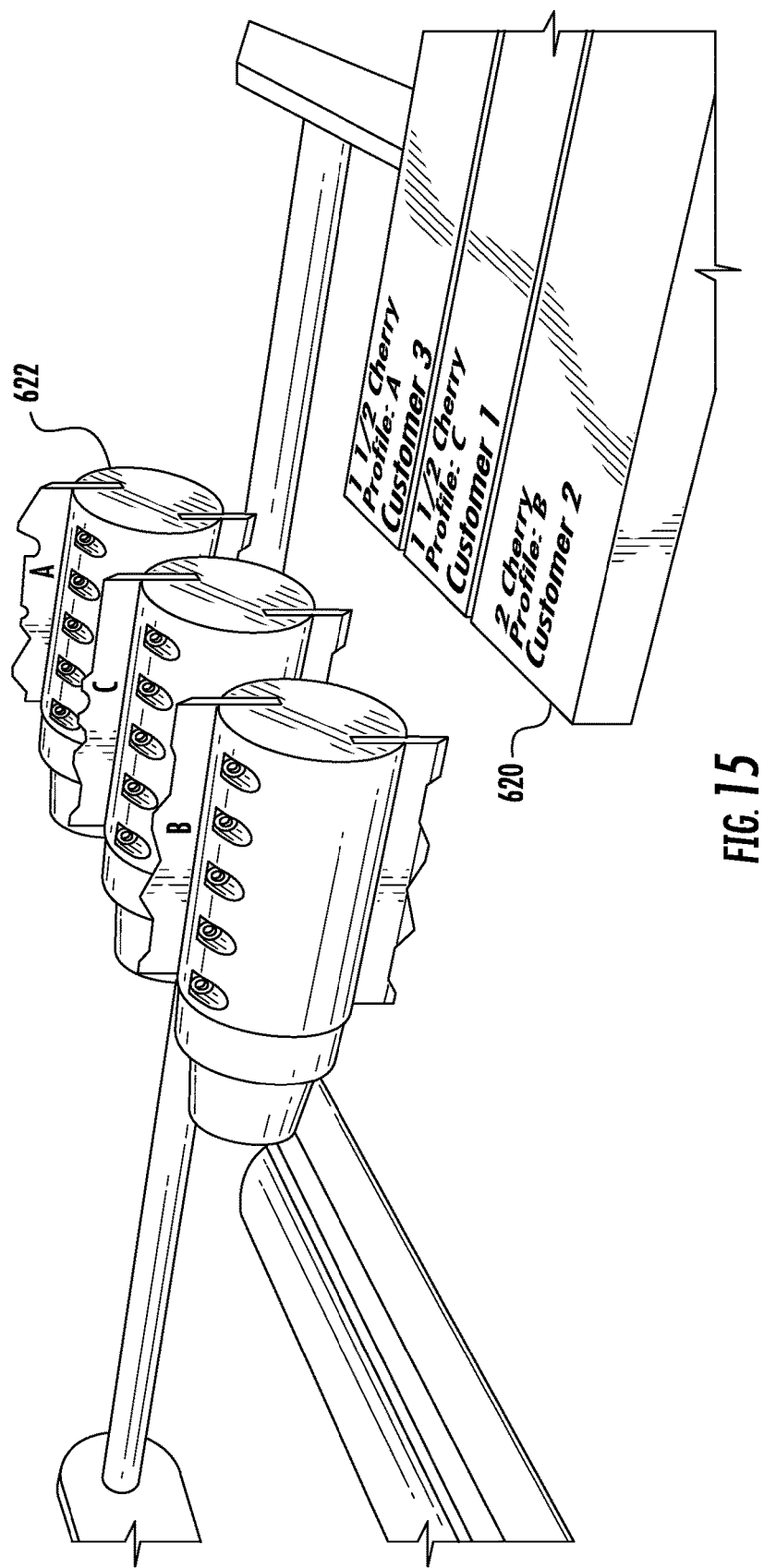
Figure 16:
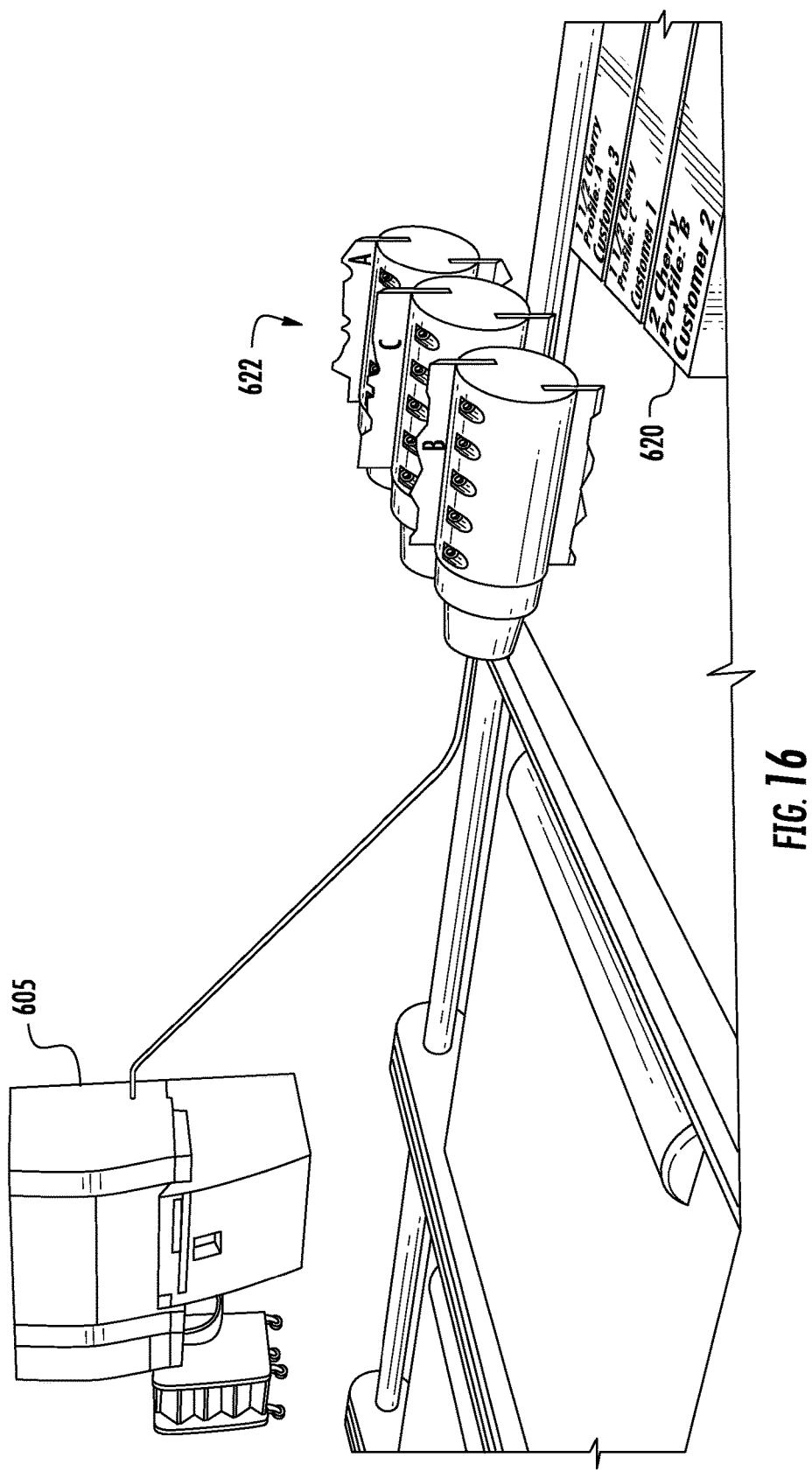
Figure 17:
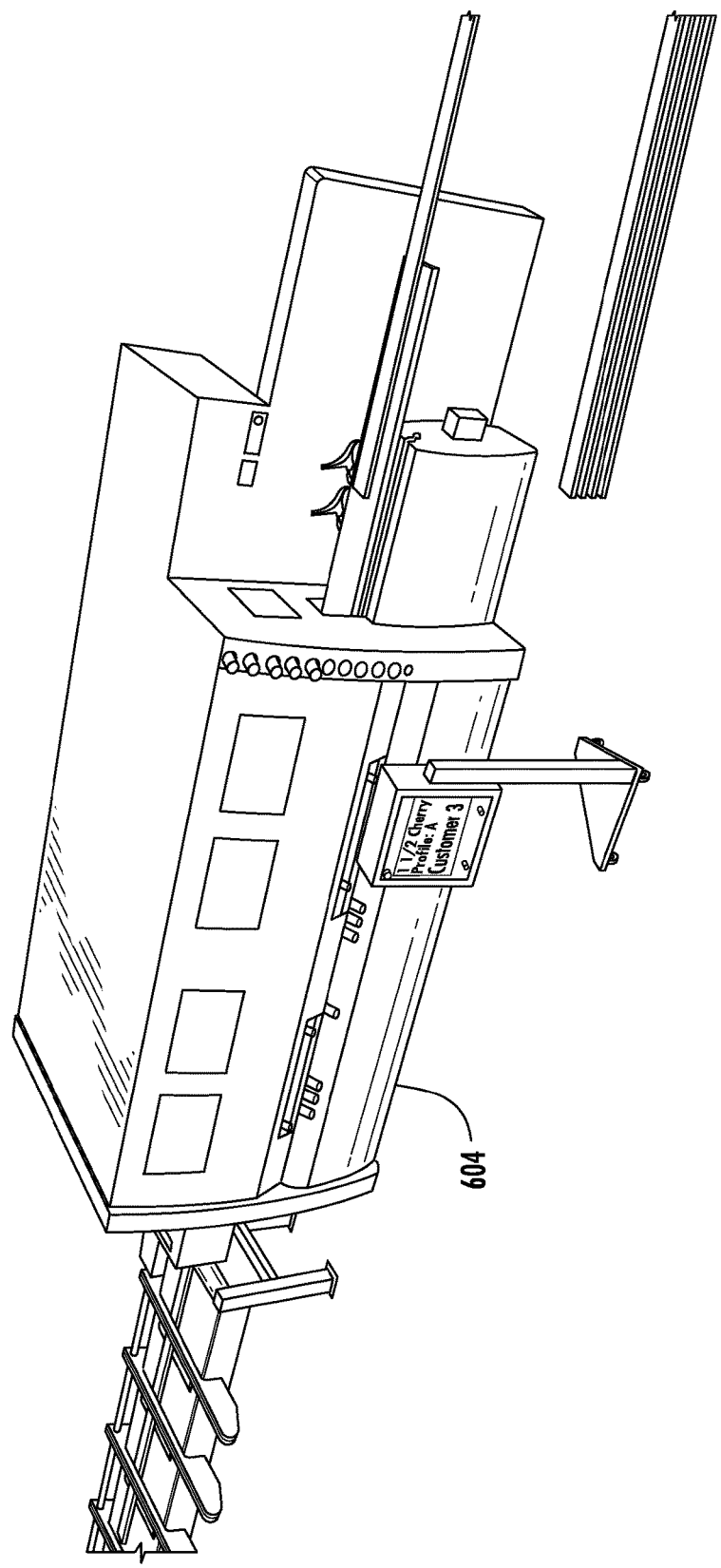
Figure 18:
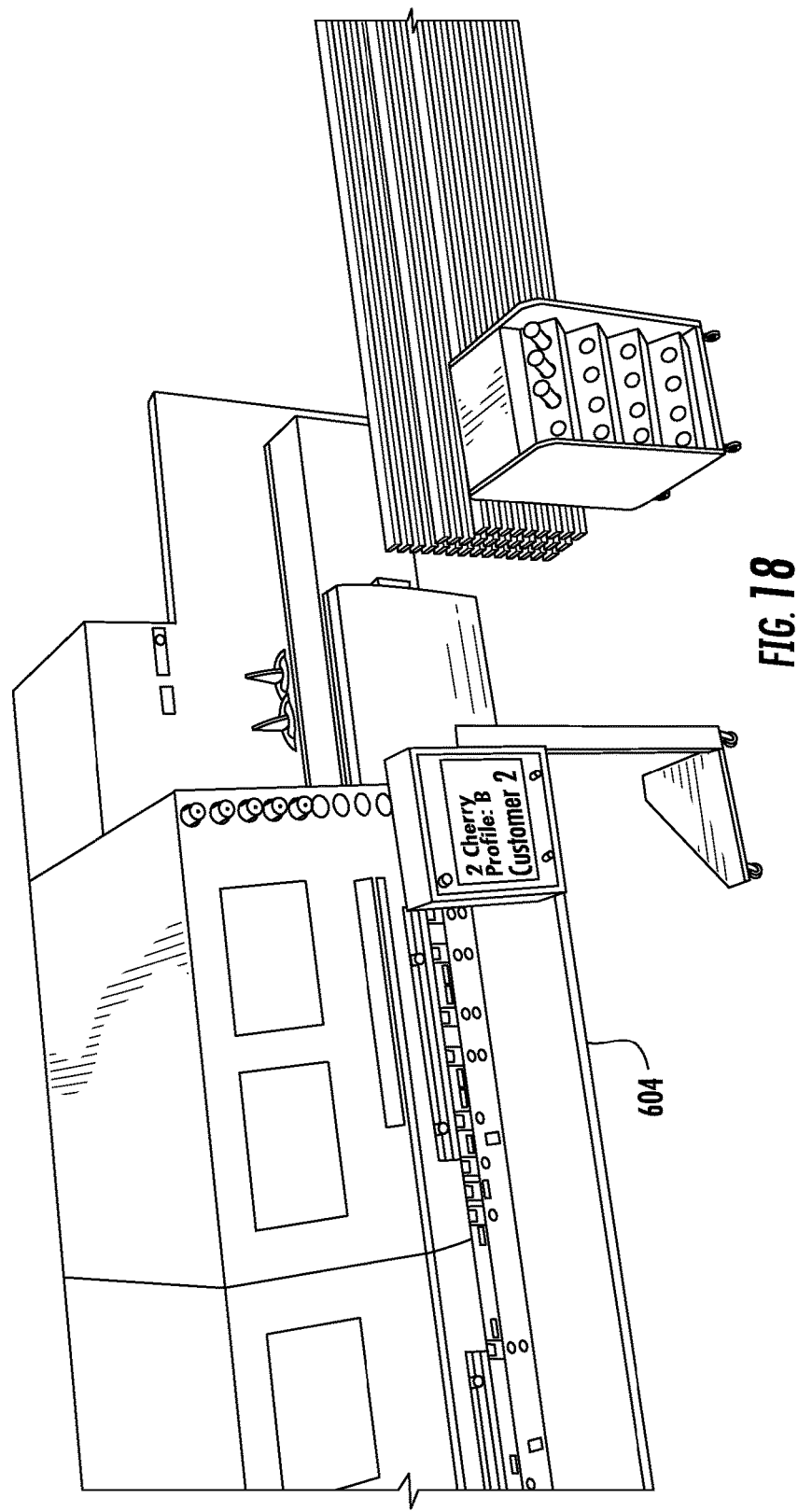
Figure 19:
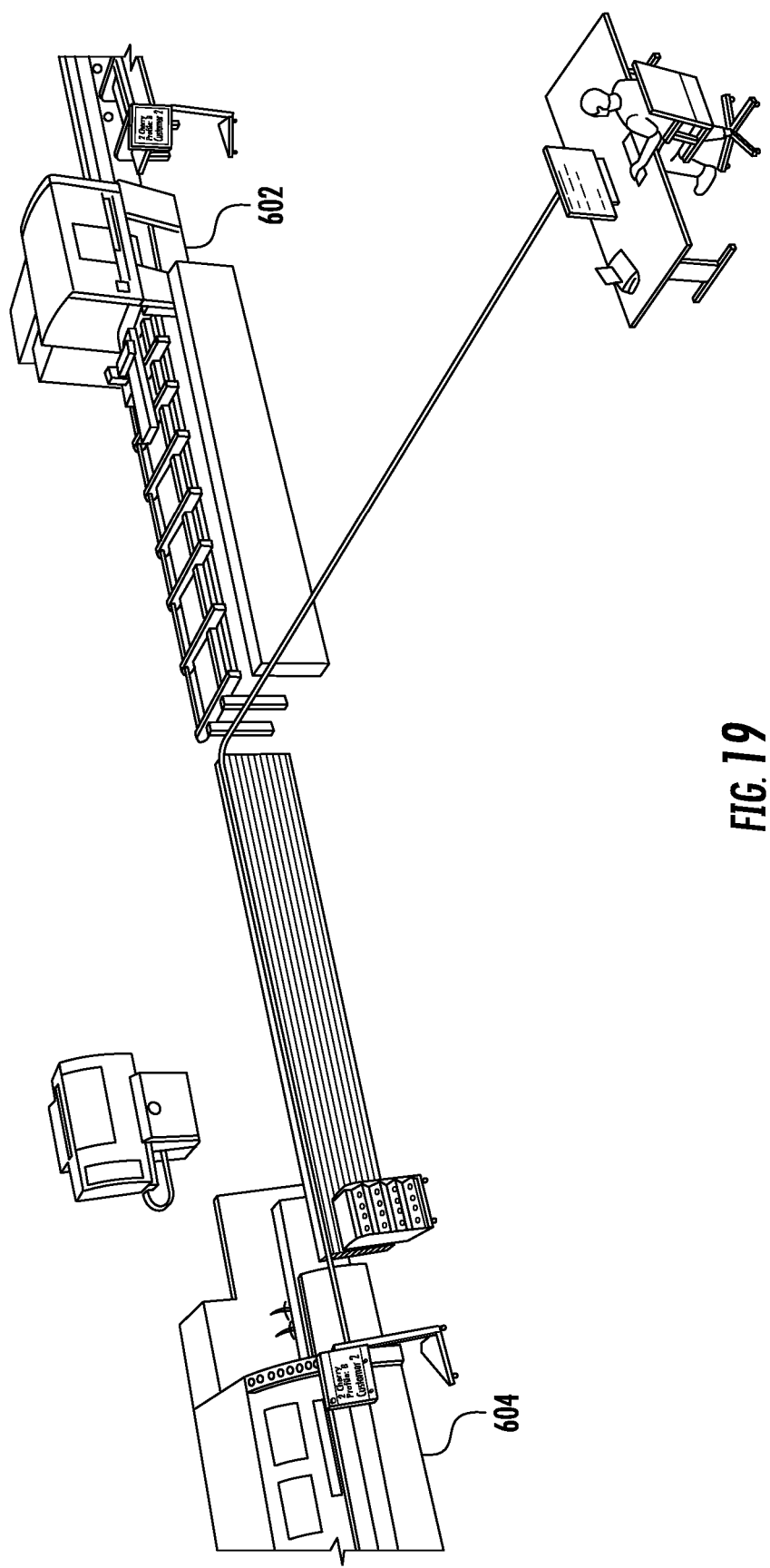
Figure 20:
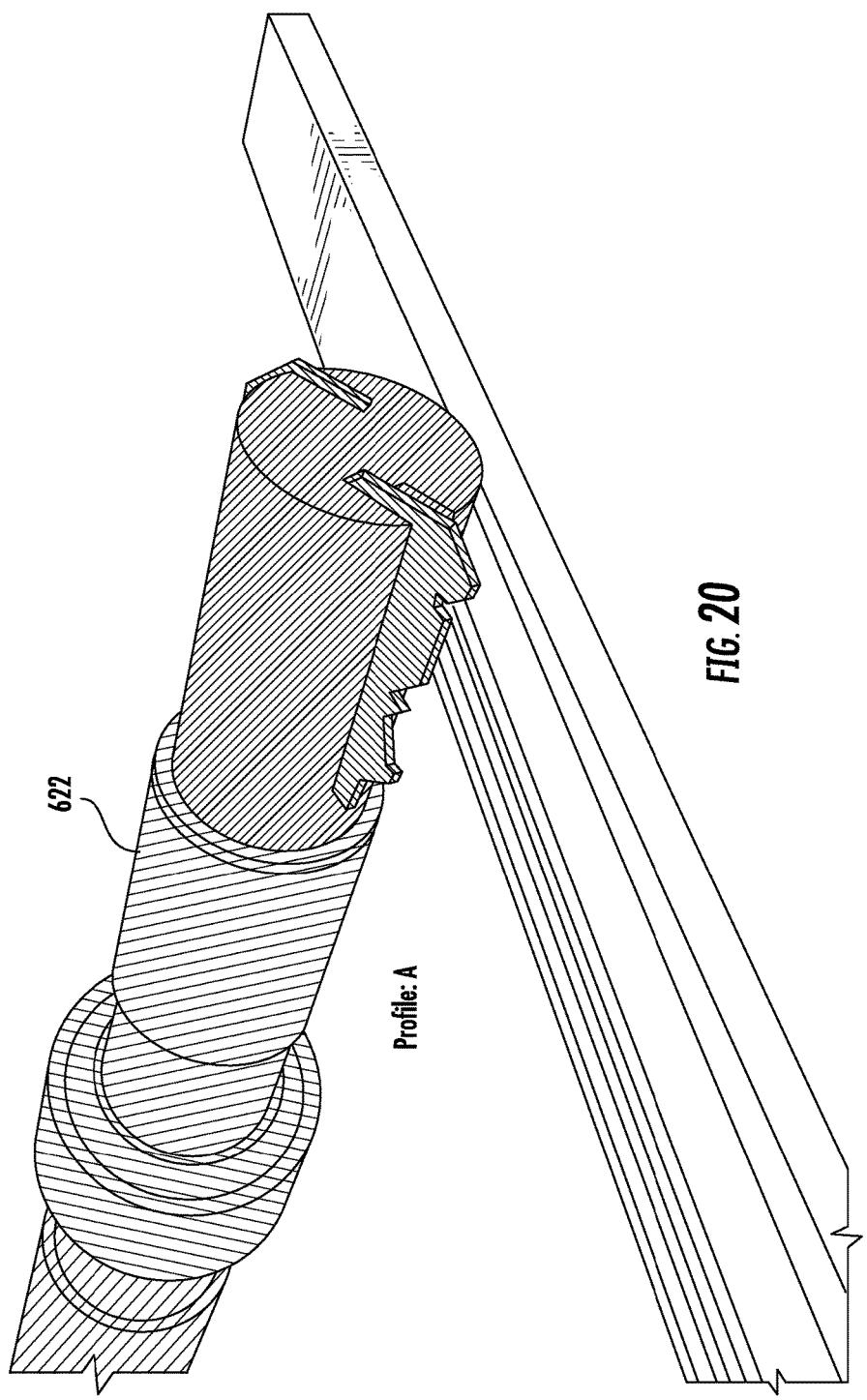
Figure 21:
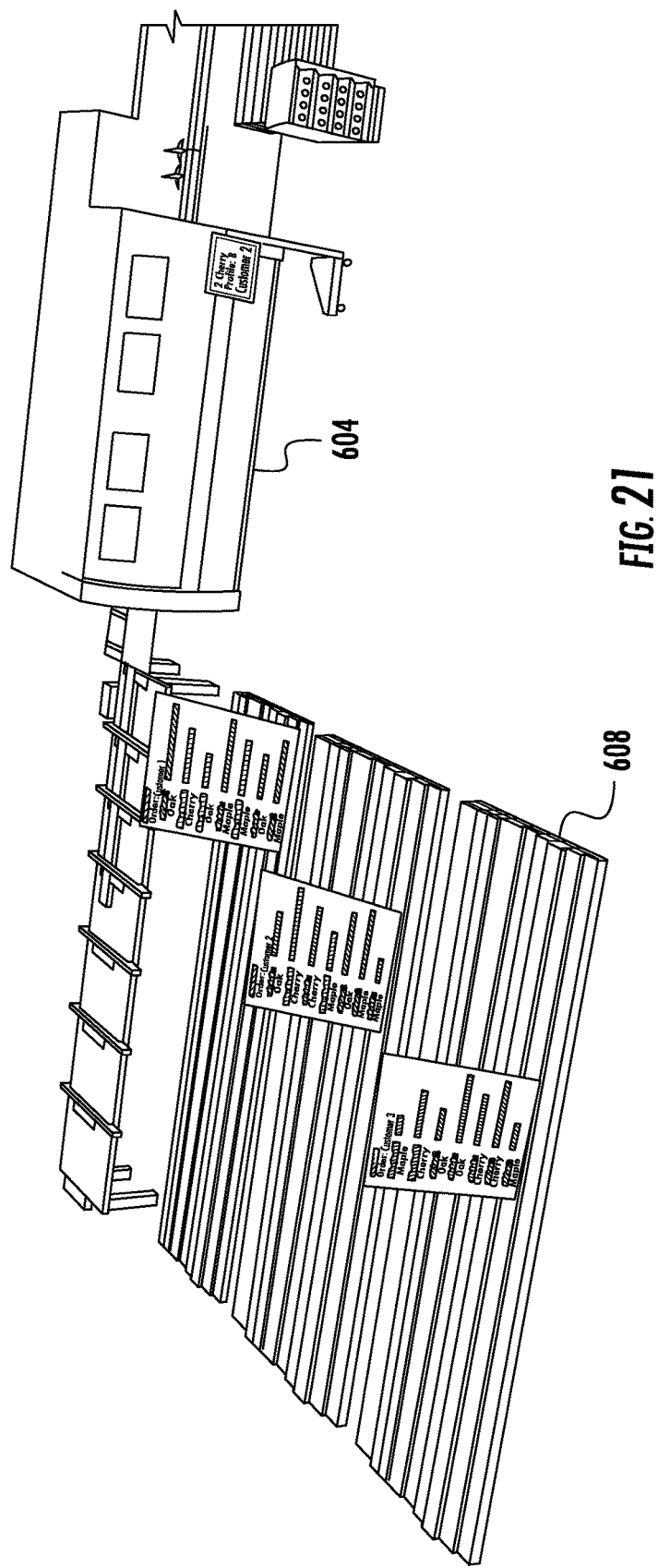
Figure 22:
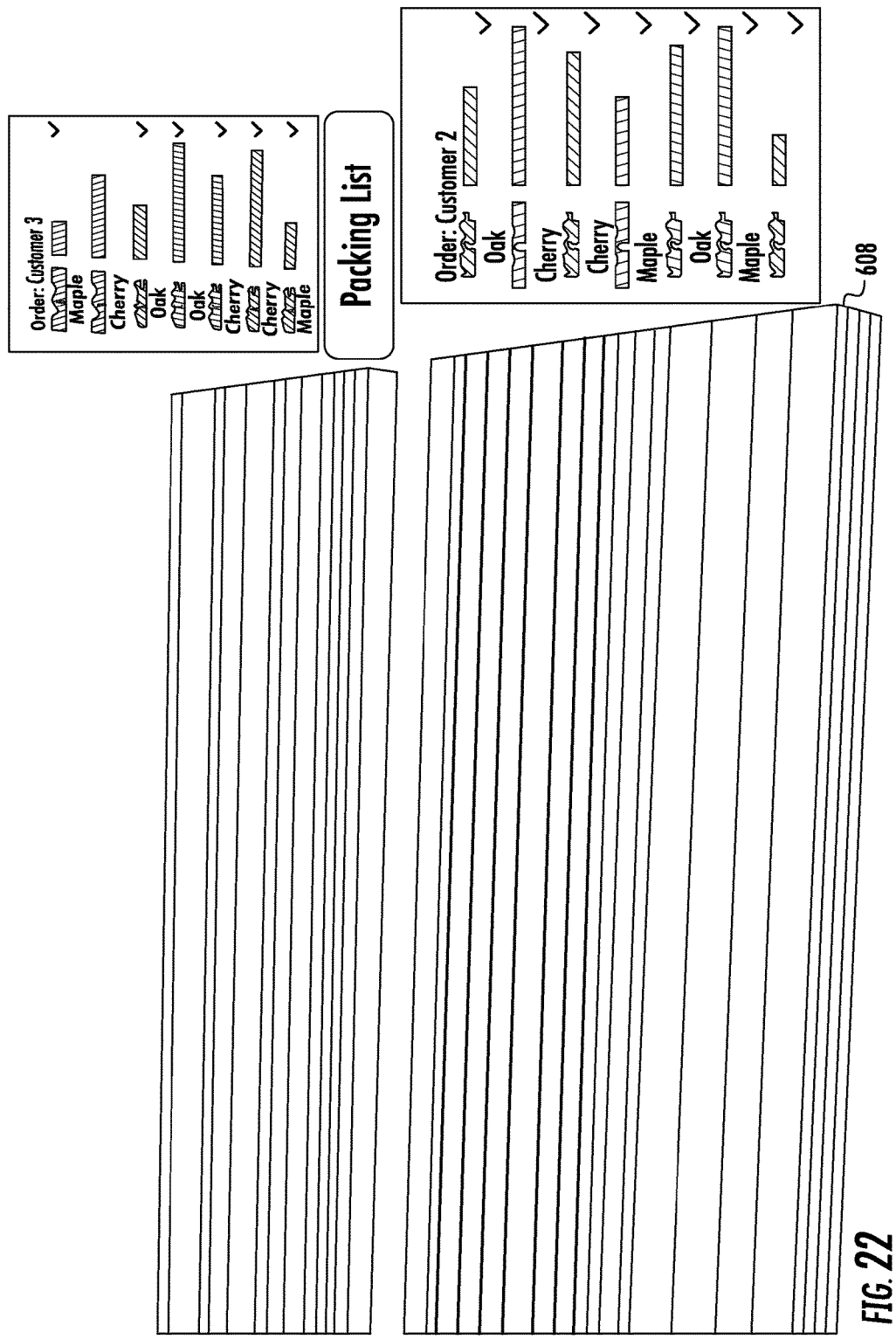
Figure 23:
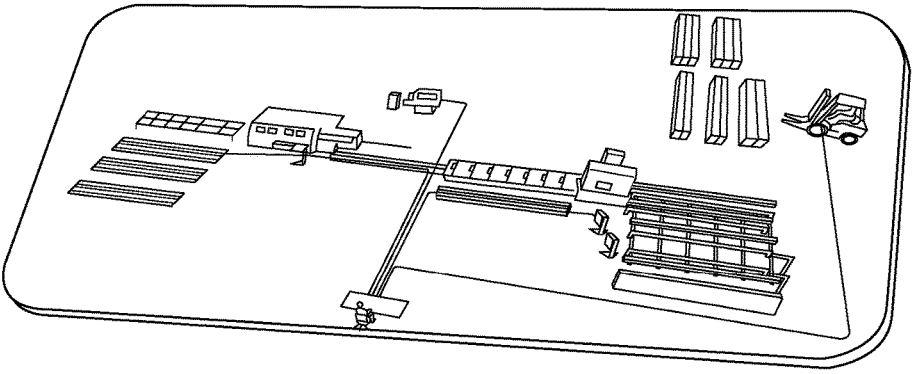
Figure 25:
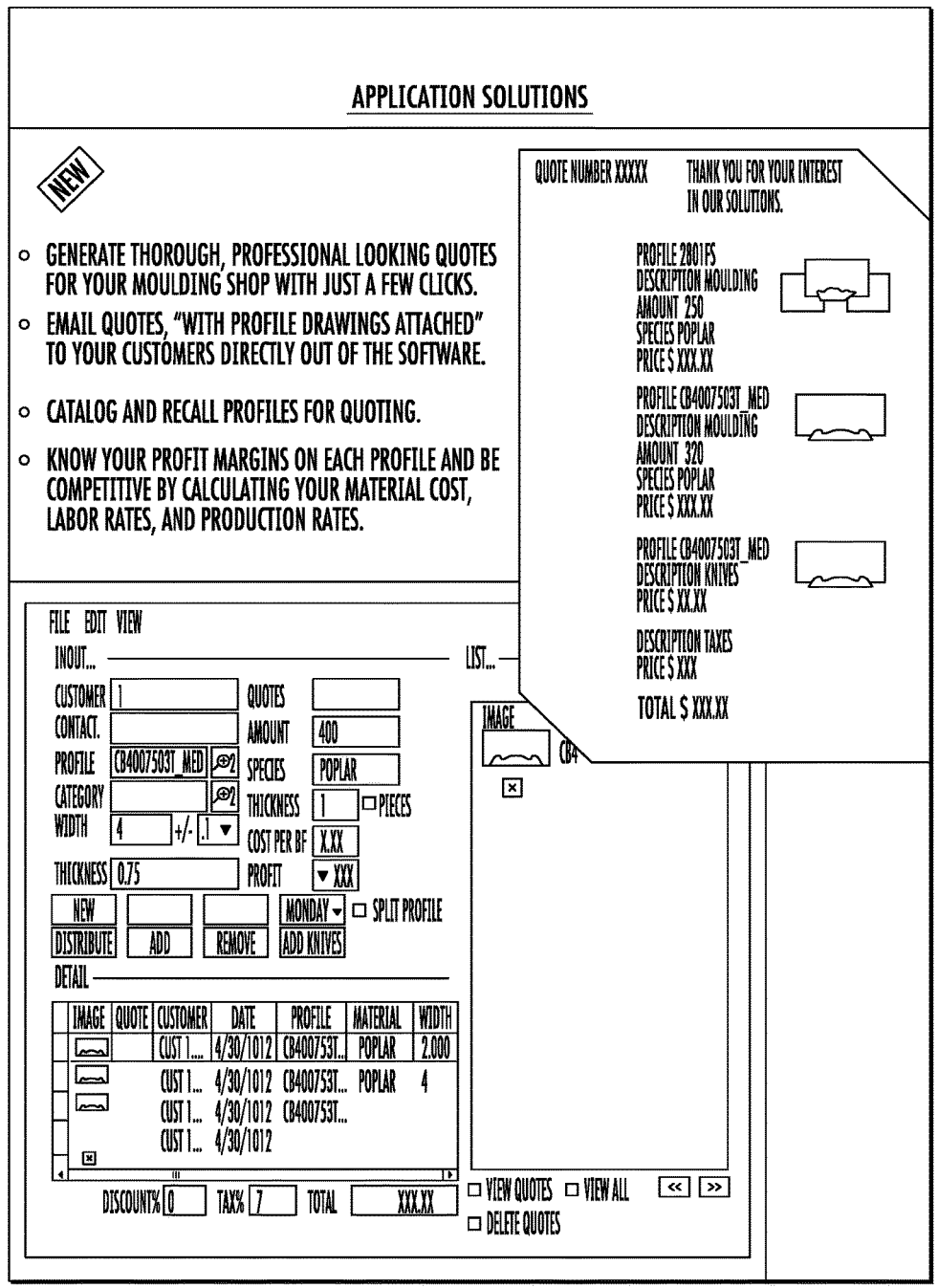

Having thus described embodiments of the invention in general terms, reference will now be made to the accompanying drawings, which are not necessarily drawn to scale, and wherein:

FIG. 1 provides a block diagram illustrating a mould manufacturing control system, according to an embodiment of the present invention;

FIG. 2 provides a flow diagram illustrating a method of controling a lineal moulding process, in accordance with an embodiment of the present invention;

FIG. 3 provides a method for receiving one or more customer orders, in accordance with an embodiment of the present invention;

FIG. 4 provides a method for executing one or more jobs, in accordance with an embodiment of the present invention;

FIG. 5 provides an illustration of a mould manufacturing control system environment, in accordance with an embodiment of the present invention;

FIG. 6 provides an illustration of a user computing device and a plurality of customer orders, in accordance with an embodiment of the present invention;

FIG. 7 provides an illustration of a batching process, in accordance with an embodiment of the present invention;

FIG. 8 provides an illustration of a batching process, in accordance with an embodiment of the present invention;

FIG. 9 provides an illustration of network communication between an application server and a production device, in accordance with an embodiment of the present invention;

FIG. 10 provides a illustration of network communication between an application server and a production device, in accordance with an embodiment of the present invention;

FIG. 11 provides an illustration of a production device, in accordance with an embodiment of the present invention;

FIG. 12 provides an illustration of a manufacturing material associated with multiple orders, in accordance with an embodiment of the present invention;

FIG. 13 provides an illustration of moving saw blades associated with a rip saw, in accordance with an embodiment of the present invention;

FIG. 14 provides an illustration of labeled strips, in accordance with an embodiment of the present invention;

FIG. 15 provides an illustration of labeled strips paired with a plurality of related tools 622, in accordance with an embodiment of the present invention;

FIG. 16 provides a an illustration of labeled strips paired with a plurality of related tools, in accordance with an embodiment of the present invention;

FIG. 17 provides an illustration of a production device, in accordance with an embodiment of the present invention;

FIG. 18 provides an illustration of a production device, in accordance with an embodiment of the present invention;

FIG. 19 provides an illustration of network communication between an application server and a production device, in accordance with an embodiment of the present invention;

FIG. 20 provides an illustration of a tool associated with a profile, in accordance with an embodiment of the present invention;

FIG. 21 provides an illustration of an order staging process, in accordance with an embodiment of the present invention;

FIG. 22 provides an illustration of an order staging process, in accordance with an embodiment of the present invention;

FIG. 23 provides an illustration and description of a lineal moulding cell, in accordance with an embodiment of the present invention;

FIG. 24 provides a description of a lineal moulding cell, in accordance with an embodiment of the present invention;

FIG. 25 provides an illustration and description of an ordering software, in accordance with an embodiment of the present invention; and FIG. 26 provides a description of an ordering software, in accordance with an embodiment of the present invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Where possible, any terms expressed in the singular form herein are meant to also include the plural form and vice versa, unless explicitly stated otherwise. As used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout. Also, as used herein an "operator" refers to an individual in a manufacturing or production facility that is in charge of the management and operation of machine tools and/or equipment.

Furthermore, as used herein, an "operator" refers to an individual in a manufacturing or production facility that is in charge of the management and operation of machine tools and/or equipment and/or management of supply, partially manufactured and/or completely manufactured inventories. It should be noted that terms "operator" and "user" may be used interchangeably throughout the specification. Also, as used herein, the term "species" shall mean one or more types of wood that may be used by a manufacturer (e.g. poplar, maple, oak, cherry, mahogany and the like). In addition, the term "order" is used herein to denote any request submitted to the manufacture of components such as solid wood moulding for fulfillment. An order may include large quantities of a particular components or moulding such as shipment to a retailer, or much smaller quantities such as materials for use in building a home or in a home improvement project. A "job" as used herein may refer to the production of one or more goods. A "profile" as used herein may refer to a specific design associated with a type of component or moulding. In addition, the terms "staging" and/or "staged" as used herein may refer to organizing and/or grouping one or more materials during the production process. As used herein generally, when the terms "mould" or "moulding" are used and the context does not dictate that moulding is exclusively intended, the terms are intended to refer more broadly to any manufactured component, such as any manufactured solid wood, and not necessarily limited solely to moulding.

Various embodiments or features will be presented in terms of systems that may include a number of devices, components, modules, cells and the like. It is to be understood and appreciated that the various systems may include additional devices, components, modules, cells etc. and/or may not include all of the devices, components, modules, cells etc. discussed in connection with the figures. A combination of these approaches may also be used.

Embodiments of the invention provide methods, systems, computer programs and the like that provide for mould manufacturing control. Embodiments of the invention employ management communication and integration amongst a plurality of devices or process stations included in a lineal moulding manufacturing process. The devices or stations may include, but not be limited to, moulders, planers, knife grinders, the grinder and/or tool room, rip saws, rip optimizing systems, and the like. For the purposes of embodiments described herein the system primarily comprises moulders and rip saws. Ripping to width is critical in solid woodworking as rip optimization is directly correlated with cost minimization. In a manufacturing process high productivity, yield and efficiency is desired. Thus, the rip saw may be embodied as a multi-rip gang saw or as an optimizing ripsaw with moveable blade technology or the like. In some alternate embodiments, the invention employs management communication and integration among other devices in a manufacturing process, such as components upstream or downstream of the lineal moulding manufacturing process. Such devices or process stations may include, but not be limited to, crosscut saws, optimizers, scanner systems, finger jointers, gluing presses, marking equipment such as printing equipment, labeling equipment and the like.

In some embodiments, the invention groups the production of one or more orders into a single batch to maximize the use of raw materials, thereby eliminating wasteful finished goods. For example, the application server may receive a plurality of orders and identify one or more batches that the orders may be divided into. The application server may then create instructions to be sent to the ripsaw, moulder, and/or other production devices. The production device(s) then execute the job based at least partially on the instructions received. Furthermore, the system facilitates communication among the production device(s) to provide a real-time status update of individual orders or the completion of the overall job.

In another embodiment, the system eliminates excess production of types of moulding. For example, a user interface associated with a forklift may receive instructions from the application server instructing the forklift operator to only retrieve from inventory materials necessary for the current job being run. To this extent, the rip saw similarly receives instructions to only cut boards that are needed for the moulding job. In this way, the materials are not wasted nor are moulding profiles overproduced.

Furthermore, the invention eliminates mistakes caused by human error. In one example, mistakes are limited because the system reduces handling steps within the manufacturing plant. This is mainly due to the high level communication that occurs between the systems components. As each component of the system is capable of sending and receiving information via a network connection, traditional forms of communication are eliminated. Additionally, mistakes are eliminated in the inventory as the inventory is automatically updated in real-time, in response to receiving communication for the production device(s) indicating the removal of materials from the inventory stock.

In some applications, for example, the system receives multiple orders from a plurality of customers. The orders are subsequently stored in a production database associated with the application server 106. The application server 106 then analyzes the order data and determines three customer orders that result in a maximum yield potential when processed as a single job. In this way, the manufacturing process may be integrated starting with its very first manufacturing step, namely, inventory retrieval. Typically, the first production device in the lineal moulding manufacturing process is the inventory station, which is provided instructions by the application server 106 from the beginning of the manufacturing process. In this way, and based on feedback from the various production devices and/or stations within the manufacturing process, the application server 106 may accurately and efficiently manage the entire manufacturing process, starting with the first steps of calculating how much and what type of inventory is required and communicating that information to the inventory station for inventory retrieval.

Returning to the example, the application server 106 identifies a first order from Customer A (Species: Cherry, Profile: A, Size 4 inches), a second order from Customer B (Species: Cherry, Profile: B, Size 2 inches), and a third order from Customer C (Species: Cherry, Profile: C, Size: 6 inches) to be executed as a single batch. Next, a user 110 indicates the priority rank of the first, second, and third order as 1, 2 and 3, respectively. The information related to the priority rank is then communicated to the application server 106 such that it is stored in the production database.

In some applications, the application server 106 then proceeds to determine a production plan based at least partially on the order information, which may be referred to as "pre-optimization". In most applications, however, the production plan is created manually by one or more operators of the system. In some cases, the application server 106 determines an amount of approximate lineal supply needed to complete one or more of the jobs. This information may then be used by the operator(s) to determine the full production plan. In the cases where the operator(s) input information regarding the production plan to the application server 106, the application server 106 may compile the information into the product plan for implementation as discussed below.

Continuing the example from above, the production plan consists of using a 12 inch board to execute a single batch containing the first, second, and third order. The production plan is then used to create job instructions for one or more production devices 104. A first set of instructions to be communicated to a user interface device associated with an inventory station that may include one or more users or operators, a user interface, a fork lift and/or a supply of lumber for use in manufacturing lineal moulding. This first set of instructions is created such that when received by the user interface, the user interface displays to the fork lift operator one or more steps involving retrieving a 12 inch board of cherry wood from inventory. Upon retrieving materials, the inventory is altered to remove one 12 inch board of cherry wood and reflect a real-time update. A second set of instructions to be communicated to a rip saw are created such that when received by the rip saw, the rip saw adjust it's moving blades to cut a 2 inch, 4 inch, and 6 inch strip from the 12 inch board of cherry wood. Upon completing the instructions, the rip saw transmits job execution information to the application server such that the job status is immediately updated. A third set of instructions to be communicated to a printer device located at the out-feed of the rip saw are created such that when received by the printer device, the printer device labels each of the three strips with their related size, species type, customer name and/or other information. A fourth set of instructions to be communicated to a user interface associated with a tool room and/or grinder are created such that when received by the user interface, the user interface displays to the tool room operator the necessary tools that need to be retrieved such that the tool room operator retrieves tools associated with moulding profiles A, B, and C. The tools are then retrieved and staged with their related strip at the moulding device. A fifth set of instructions to be communicated to the moulder are created such that when received the moulder first executes a job to mould profile A into the 2 inch strip of cherry wood, second executes a job to mould profile B into the 4 inch strip of cherry wood, and third executes a job to mould profile C into the 6 inch strip of cherry wood. The user 110 receives a call from Customer C indicating the need for a rush order. The application server 106 then creates a sixth set of instructions to be communicated to the moulder such that when received the moulder finishes executing the first order and executes the third order prior to executing the second order. The materials are the staged and associated with packing list until they are ready to be shipped.

In summary, the system controls the moulding manufacturing process, such that order information is received and analyzed to determine how materials and/or resources can be optimized during initial inventory retrieval and production, and communicates real-time job information to every component of the manufacturing system. Furthermore, the system provides a paper free manufacturing system that can effortlessly exchange information between multiple pieces of machinery, computing systems and users.

FIG. 1 provides a mould (or moulding) manufacturing control system environment 100, in accordance with one embodiment of the present invention. As illustrated in FIG. 1, the application server 106 is operatively coupled, via a network 101, to the production device 104, and to the user computing device 108. It should be noted that the production device may include one or more production devices, such as mechanical devices, machinery and the like. It should be further noted that the terms "user computing device" and "user computing system" may be used interchangeably throughout the specification. In this way, the application server 106 can send information to and receive information from the production device 104 and the user computing device 108 to effectively manage the manufacturing process.

Communication between the application server 106 and the production device(s) 104 may be established in various ways. For example, in one embodiment, the production device 104 may be a rip saw 602. In one specific embodiment of the system, initiating a connection for communication between the rip saw 602 and other system components may be executed using three software components or modules. A first software component may be associated with the rip saw 602 such that the software is stored in the memory device 116 and executed by the processing device 114. A second software component may be associated with the application server such that the software is stored in the memory device 150 and executed by the processing device 148. The second software component may be a director of machine and office software.

In various embodiments, establishing a connection may include operatively connecting in a variety of ways. For example, in one embodiment, establishing a connection for communication may comprise establishing a socket connection. The rip saw 602 may establish a socket connection with one or more software components stored on the application server 106 by initiating a request for a connection. Upon retrieval of the request, the second software component may create an instance to the data such that the application server 106 boots an instance of a third software component associated with the rip saw 602 server. To this extent, the rip saw 602 and application server 106 may establish a client server connection. For example, when the rip saw 602 wishes to establish a connection, the first software component may send a first character string to the second software component. The first character string may be any alphanumeric combination which requests a new connection between two communication devices. In response to receiving the first character string the second software component may then boot an instance of an executable server file. In one embodiment, the executable server file may exist in the same folder as the second software component. Once the third software component is booted successfully with a connection to the database, it may send its current port setting to the second software component.

The first software component may retain its connection to the second software component until it receives a second character string. The second character string may be any alphanumeric combination which indicates a port number-representing the new port for the first software component to make its connection to the third software component. The first software component may then disconnect from the second software component and establish a connection to the third software component via the new port setting. The third software component may wait a period of time, such as thirty (30) seconds, for the connection to be established. In one embodiment, if there is no connection for a consecutive thirty (30) seconds, the third software component will turn itself off. Once the connection is established between the first software component and the third software component, the data is then accessible for the first software component.

There are several requests that the rip saw may make with the server. The request may include, but not be limited to, a request to get materials, get quantity, get batches, get jobs, get length, get batch name, and get cut list name. It should be noted that one or more instructions may be combined. The instructions to get batches tells the application server 106 to send all of the related batch data and cut lists to the rip saw 602 in collections of width, thickness, species, and profile if the process is moulded before cutting. The collection is grouped into batches as selected in the production release. The response begins a character string indicating that batches are contained therein. It then proceeds with a list of all available batches and associated cut lists. The list may repeat until the response terminates. Once a list of available cut lists is presented, the application operator will then select one of these items resulting in the application sending a request for the selected lengths. The request to get batches may further include information related to wood species and thickness. In one embodiment, in response to the request to get materials, the server may respond with a list indicating all the materials in the production database and the manufacturing thickness requirements associated with each material. The list may continue to be sent until there is not additional data to send. In another embodiment, in response to the request to get batches, the server may respond with the batch name, rip thickness, rip dimensions, a plurality of rip widths, rip number, print text, mode, minimum length, maximum length and the like. The list may continue to be sent until there is not additional data to send. In one embodiment, the mode may be associated with a numeric value. The mode(s) may include a first and second dimensional accumulation, count accumulation and the like. The instruction to get jobs tells the application server 106 to send all of the related job data and cut lists to the rip saw 602 in collections of width, thickness, species, and profile if the process is mould before cutting. The collection may be grouped into batches as selected in the production release. The response, as with the batch request, begins with a character string indicating jobs are contained therein then proceeds with a list of all available batches and associated cut lists. The list will repeat until the response terminates with a character string indicating the end of the list. Once a list of available cut lists is presented, the application operator will then select one of these items resulting in the application sending a request for the selected lengths. The get operator instruction allows operators to login at the application. This instruction may be used to log in bundles with the application server bunk tally number. It further allows the rip saw 602 to update per board the bundle associated to the cut part. It should be noted, that any instruction, provided for a specific machine or production device, may also be used in association with a different machine or production device.

After the order is built on the rip saw 602, the rip saw 602 may send a receipt to the application server 106. The receipt may comprise a plurality of rip numbers associated with the successfully completed jobs. If a board is processed using rip optimizing software the receipt may include the board number, a reference ID number associated with the server application, rip yield, net yield, area, rip quantity, item mode, board length, board width, item type and the like. The item type may be associated with an alphanumeric value. Different item types may include fixed width, random width, reclaim material and the like. The result of the receipt is that the application server 106 may then maintain actual production data that can be referenced by a user 110 at a user computing device 108.

Miscellaneous instruction may be sent to and received from the application server 106. Miscellaneous instructions sent to the application server 106 may include, but is not limited to, package printing instruction, package identification instructions and machine identification information. Miscellaneous instructions received from the application server 106 may include instructions to provide a display message. The instructions may also be accompanied with an associated port number.

In an embodiment where a scanner is directly connected downstream of the rip saw 602, the following may describe the events in sequence. Upon the server being called by the rip saw 602, the server will connect to a protocol program or protocol program interface. This connection will serve as a translator between the data to be sent from the server and the protocol program. The extent of the data to be passed may be for part definition related to the rip items selected on the rip saw 602. The data is to be passed directly from the third software component to the application without prompt. Upon completion of a built order and an update from the rip saw 602, the server will send information related to one or more cut list. The cut list may contain parameters such as species ID number, description, value unit, value amount (multiplier), minimum and maximum length, width and thickness, quality ID, marking Text, kicker number, quantity required, quantity units and the like. Each field item may be sent for each record. In one embodiment, a receipt of this transaction may follow due to the remote nature of the system. If no errors are present the receipt may return a character string indicating no errors were found. In an alternative embodiment, if an error is detected the receipt may return a character string indicating an error was found.

The result of a completed rip-cut board may be a message from the application that defines the board with various data. The first string may identify the board, and the operator or bundle number associated to the cut list. A sequence may identify the parts in sequence as they are referenced on the board. The sequence may include the bundle number, width, part length, grade, board length, yield, part number, and the like.

It should be noted that, in addition to communicating with the application server 106, production devices 104 may also communicate directly with one or more additional production devices and the user computing device 108. In one embodiment, the application server 106 can send order and/or job information to and receive information from a plurality of production devices 104. As such, the application server 106 may function as a central communication point for controlling the lineal moulding process. For example, the application server 106 may receive a plurality of orders 612 and may communicate instructions, associated with processing the order, to the production devices 104. FIG. 1 illustrates only one example of an embodiment of a system environment 100, and it will be appreciated that in other embodiments, one or more of the systems, devices, or servers may be combined into a single system, device, or server, or be made up of multiple systems, devices, or servers.

The network 101 may be a global area network (GAN), such as the Internet, a wide area network (WAN), a local area network (LAN), or any other type of network or combination of networks. The network 101 may provide for wireline, wireless, or a combination of wireline and wireless communication between devices on the network.

In some embodiments, the user 110 is an individual employed by a manufacturing company and tasked with overseeing the manufacturing process. One or more orders may be made by a plurality of customers online or offline, over the phone, at a merchant's place of business and/or by other transaction means such that the orders are received at the application server 106 and displayed on the user computing device 108. The order may be made by a customer using a computing device or mobile computing device (i.e. smart phone, PDA, etc.) or other types of systems that communicate with the application server 106 to allow the manufacturer to receive and process an order. In other embodiments, the user 110 may access an order stored on the application server 106 and make changes to the order using the user computing device 108 such that the changes are saved in the application server 106 and the updated order information is simultaneously communicated to the production devices 104. In some embodiments, the user 110 may be an operator, employee, agent, independent contractor, etc. acting on behalf of the manufacturer to process a job.

As illustrated in FIG. 1, the application server 106 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the network 101 and other devices on the network 101, such as, but not limited to the user computing device 108 and the production device(s) 104. As such, the communication device 146 generally comprises a modem, server, or other device for communicating with other devices on the network 101.

As further illustrated in FIG. 1, the application server 106 comprises computer-readable instructions 154 stored in the memory device 150, which in one embodiment includes the computer-readable instructions 154 of an application 158. In some embodiments, the memory device 150 includes data storage 152 for storing data related to customer orders and/or manufacturing information including but not limited to data created and/or used by the application 158 or the user 110. The data storage 152 may also store real-time update information for production device(s), manufacturer inventory, order history, production statistics and the like.

In the embodiment illustrated in FIG. 1 and described throughout much of this specification, the manufacturing control application 158 allows the user 110 to interact with the system. First, manufacturing control application 158 allows a user 110 to interact with the customer orders and manage the production process, via the production device 104. Next, the application 158 allows the user 110 to receive real-time updates related to the status of a job and/or a plurality or orders. Both sending and receiving job and/or order information may be performed by a using an interface, such as a user interface associated with production device 104 or user computing device 108, provided from the application 158 via a network 101.

In some embodiments, the manufacturing control application 158 allows the user 110 to communicate with the production device 104, to indicate manual changes in the production process. This communication may be in the form of text communications, voice communications, or the like. Typically, the production process is controlled by instructions created via the application server 106, but in some instances the user may interject and manually alter the production process. The manufacturing control application 158 may receive manufacturing information related to a job via the user computing device 108. The user 110 may also use the user computing device 108 to query the real-time status of an order and/or job.

The jobs and/or batches may be associated with one or more customer orders. This is largely due to the high efficiency that is yielded when grouping one or more orders for production. In this way, the orders are produced as a collection of items versus individually. In a specific embodiment, the order may be grouped based on like species and profiles. These collections can be staged until each job associated with the order is completed, as illustrated in FIG. 21. In some embodiments, the orders may be labeled with printed identifiers that aide in the identification of each strip during the staging 608 process. In this way, the like elements can be easily identified.

The user 110, through the user computing device 108, may provide the manufacturing control application 158 data with respect to product manufacturing. The manufacturing control application 158 may then store the data related to the user input such as, but not limited to the order priority rank, order cancellations, order amendments, etc. In this way, the manufacturing control application 158 may have access to all real-time information being received by the user. In an instance that the priority rank has been changed the manufacturing control application 158 may queue updated instructions to be sent to the production devices 104. In one embodiment, the manufacturing control application 158 may detect a favorable combination of order component that will further optimize the production in light of the updated instructions.

The manufacturing control application 158 may also receive data from the user computing device 108. The user computing device 108, as explained in further detail below, may allow the manufacturing control application 158 to determine the priority of each order. Because the user computing device 108 may send an order priority rank for each order to the application server 106, the manufacturing control application 158 may receive data regarding the one or more orders from the application server 106. In this way, the manufacturing control application 158 may determine an optimal production plan for manufacturing the plurality of orders 612. The data stored within the manufacturing control application 158 provides computer readable instructions 154 to the processing device 148 to allow for the production of a plurality of jobs associated with one or more orders 612 received by multiple customers. The manufacturing control application 158 stores statistics related to successful job executions as well as statistics related to the efficiency of the overall system.

In some exemplary embodiments, the manufacturing control application 158 provides the user 110 with the availability of choices but does not automatically determine priority of each order and/or does not determine the production plan. Rather, the application 158 may provide recommendations for one or both of the priority of each order and/or the production plan. In some embodiments, the application 158 does not provide the priority of any order or determine the production plan automatically, but rather, a user 110 inputs both the priority of the orders and determines the production plan. The application 158 then implements the production plan (i.e., methods 400 and 500 discussed below).

Matching details of orders provided by one or more customers may require an analysis of the data located in the application server 106, production information, and/or order history. The manufacturing control application 158 may provide an optimized production plan that executes a plurality of jobs based upon an analysis of various information. The manufacturing control application 158 uses these factors to determine which combination or orders will create a batch that may yield the maximum yield potential. In some embodiments, the production plan may be translated into instructions to be executed by the production devices 104.

As illustrated in FIG. 1, the user computing device 108 generally comprises a reader device 135, a communication device 136, a processing device 138, and a memory device 140. The reader device 135 is operatively coupled to the processing device 138, communication device 136, and the memory device 140. The user computing device 108 may include a reader device 135 to receive order information from the user 110. Such a reader device 135 may include a magnetic strip reader, a barcode scanner, a radio frequency (RF) reader, a character recognition device, a magnetic ink reader, a processor for interpreting codes presented over an electrical or optical medium, a biometric reader, a wireless receiving device, and/or the like. In some embodiments, the reader device 135 receives information that may be used to manage the overall production process and communicates the information via the communication device 136 over a network 101, to other systems such as, but not limited to application server 106 and/or the production device(s) 104. As such, the communication device 136 generally comprises a modem, server, or other device for communicating with other devices on the network 101.

As further illustrated in FIG. 1, the user computing device 108 comprises computer-readable instructions 142 stored in the memory device 140, which in one embodiment includes the computer-readable instructions 142 of a user application 144. A user computing device 108 may refer to any device used to interact with the application server 106, either from the operator's perspective, the manufacturer's perspective or both. In some embodiments, the user computing device 108 may refer only to a user's device, in other embodiments it refers only to a plurality or user devices, and in yet other embodiments, it refers to both a user device interacting with other devices to perform a job. For example, in one embodiment, the user computing device 108 refers to the user computing device configured to communicate with a production device 104, whereas in other embodiments, the user computing device 108 refers to the production device 104 configured to communicate with a user computing device 108, and in yet other embodiments, the user computing device 108 refers to both the user computing device and the production device(s) 104 configured to communicate with each other to carry out a job. In one embodiment, the user computing device 108 may be a kiosk or special terminal for managing orders.

In some embodiments, a user computing device 108 is or includes an interactive computer terminal that is configured to initiate, complete, and/or facilitate one or more real-time order activations. A user computing device 108 could be or include any device that a user may use to interact with the application server 106, such as, but not limited to, a contactless device (e.g., a key fob), a radio frequency identification device (RFID) and the like, a computer, (e.g., a personal computer, tablet computer, desktop computer, server, laptop, etc.), a mobile device (e.g., a smartphone, cellular phone, personal digital assistant (PDA) device, MP3 device, personal GPS device, etc.), a merchant terminal, a self-service machine (e.g., vending machine, self-checkout machine, etc.), a public and/or business kiosk (e.g., an Internet kiosk, ticketing kiosk, etc.), a gaming device, and/or various combinations of the foregoing.

In some embodiments, a user computing device 108 is operated in a manufacturing warehouse. In other embodiments, the user computing device 108 may be operated remotely such that the user computing device 108 is not located in the manufacturing facility. In accordance with some embodiments, the user computing device 108 is not owned by the operator of the user computing device 108. Rather, in some embodiments, the user computing device 108 is owned by a manufacturing company. In yet other embodiments, the user computing device 108 is owned by a third party providing functionality to facilitate and manage a manufacturing process in accordance with embodiments of the invention described herein.

In the embodiment illustrated in FIG. 1, the user application 144 allows the user computing device 108 to be linked to the application server 106 to communicate, via a network 101. Information related to the order being made, such as the customer name, quoted cost of the order, quantity, sizes, profiles, species and the like may be displayed on the user computing device 108. The user application 144 may provide the manufacturing control application 158 with user input related to the manufacturing process, such that the manufacturing control application 158 may implement job instructions and, in some embodiments, determine an optimal plan for manufacturing a plurality of orders 612.

The user application 144 may also receive information from the application server 106. The user application 144, in some embodiments, may receive an order from the manufacturing control application 158, such that they user application 144 may display the order to the user 110 on a display on the user computing device 108. In this way, the user 110 may receive an option to alter an order that the system is already in the process of manufacturing. The order may be displayed on the user computing device 108 such that the user 110 may make changes to the order in real-time as the order is being produced.

FIG. 1 also illustrates a production device 104. The production device 104 may include a communication device 112, a processing device 114, and a memory device 116, which may include a data storage 118. The processing device 114 is operatively coupled to the communication device 112 and the memory device 116. The processing device 114 uses the communication device 112 to communicate with the network 101 and other devices on the network 101, such as, but not limited to the user computing device 108, the application server 106. As such, the communication device 112 generally comprises a modem, server, or other device for communicating with other devices on the network 101.

As further illustrated in FIG. 1, the production device 104 may include computer-readable instructions 120 stored in the memory device 116, which in one embodiment includes the computer-readable instructions 120 of a device application 122. A production device 104 may be or include any mechanical device and/or machinery, such as a rip saw 602, moulder, cross cut saw, or other machinery including, but not limited to coping machines, forklifts, or the like. Although only a single production device 104 is depicted in FIG. 6, the system environment 10 may contain numerous production devices 104.

Referring now to FIG. 2, a flowchart illustrates a method 200 for controlling a lineal moulding process according to embodiments of the invention. As represented by block 300, the system first receives one or more orders from a plurality of customers, as shown in FIG. 6. In one embodiment, the order(s) may be related to wood manufacturing. As such, the information received may include, but not be limited to, information such as the customer name(s), quote, contact information, amount(s), order quantity, sizes, profiles, species, category(s), thickness, width, cost per board foot (BF) and the like. The order information may be received either online and/or offline, via telephone, at a merchant's place of business and/or by other transaction means such that the order(s) are submitted electronically to the application server 106. In another embodiment, the order may be submitted as a blueprint such that the application server analyzes the blueprint, identifies the dimension associated with each rooms, and determines the necessary materials to complete such an order. In one embodiment, orders are received in a manner that completely eliminates a paper trail. For example, orders may be directly transmitted, electronically, from the customer to the application server 106. To this extent, the elimination of a paper process increases the accuracy of order information as the user 110 is not required to manually enter order information into the system. Orders may be received by means of email, electronic forms, website interface(s), mobile applications and the like.

As represented by block 400, after a plurality of orders 612 have been received, the orders are analyzed and used to create job instructions for producing the one or more orders. The job instructions are then transmitted to one or more production device(s) via the network 101. In one embodiment, a cumulative instruction list that comprises job instructions for each of the devices is sent to the one or more production devices 104. In such an embodiment, the production device(s) may be configured to extract from the job instructions the specific steps related to its designated piece of machinery. For example, the job may require three pieces of machinery. The three pieces of machinery may include a rip saw 602, a moulder, and a grinder or tool room 605. As such, the instructions may comprise a first set of steps to be executed by the rip saw 602, a second set of steps to be executed by the moulder, and a third set of steps to be executed by the tool room 605. The cumulative instructions, including all three sets of steps, may be sent to the three pieces of machinery. Upon receiving the instructions the rip saw 602 may extract the first set of steps, the moulder 604 may extract the second set of steps, and the tool room 605 may extract the third set of steps such that each machine is aware of the role it plays in the overall production process with respect to all the production devices 104 involved in the manufacturing a job.

In another embodiment, the application server 106 is configured to separate the job instruction list and send specific components of the job instructions to the exact machine intended to execute the specific portion of instructions. For example, the job may require three pieces of machinery. The three pieces of machinery may include a rip saw 602, a moulder, and a coping machine. As such the instructions may comprise a first set of steps to be executed by the rip saw 602, a second set of steps to be executed by the moulder, and a third set of steps to be executed by the coping machine. In such an embodiment, the first set of steps are sent to the rip saw 602, the second set of steps are sent to the moulder, and the third set of steps are sent to the coping machine such that each piece of machinery only receives instructions that are specific to the task that it must execute and the application server 106 maintains a master list of the job instructions containing all the steps to be executed by each production device 104.

As represented by block 500, upon receiving job instructions, one or more orders may be executed based at least partially on the steps provided in the job instructions. The job may also be executed based at least partially upon information that is manually entered by one or more users 110. For example, the user 110 may manually select the priority of each order received. In one embodiment, order priority may be directly communicated from the user computing device 108 to the production device(s) 104. In another embodiment, order priority may be directly communicated from the user computing device 108 to the application server 106 such the order priority is reflected in the job instructions.

In various embodiments, one or more sub-steps show in FIG. 3 are included in receiving the one or more customer orders 300. As represented by block 302, order information associated with the one or more customer orders is first received. As previously stated, the order information received may comprise information such as the customer name(s), order quantity, sizes, profiles, species and the like. The order information is then stored in a database associated with the application server 106 such that the order information may be retrieved, altered, removed and the like at any point in time. In one embodiment, a record is stored in the database for each single order that is received. In another embodiment, a record is stored in the database for each customer such that one customer record may be associated with a plurality of orders 612. In yet another embodiment, a single record is stored in the database that comprises all the information related to every order received such that the cumulative record may be used to analyze the orders on a mass scale.

As represented by block 304, receiving the one or more customer orders 300 may include receiving a priority rank for each of the orders. The priority rank may be used to indicate the importance or an order and/or expedite the production of a specific order. Order priority ranks can also be reflected in the production of batches 614 and/or combined jobs. For example a batch containing an order with a priority rank of one (1), one being the highest priority, may be manufactured before a batch 614 containing an order with a priority rank of five (5). Priority ranks may be numeric, alpha-numeric, color coded and/or use another type of ranking system. In an embodiment where the priority rank is numeric, the priority of a batch 614 or job may be determined by averaging the priority ranks of all the orders included in the batch or job. For example a first batch 614 may include orders with priority ranks of one (1), five (5) and six (6). Likewise a second batch 614 may include orders with priority ranks of two (2), three (3) and four (4). To this extent, the second batch, having an average priority rank of three (3), will be manufactured prior to the first batch 614, having a priority rank of four (4). The priority ranks may be edited by the user 110 at any time throughout the production process such that editing the priority of one or more orders 612 will be reflected in real-time throughout the production process. For example, the user 110 may manually update the order priority ranks using the user computing device 108 such that the updated priority rank information is immediately communicated to the application server 106 which in turn may communicate the updated priority rank information to the production devices 104. In one embodiment, updating the priority rank in real-time may comprise the production devices to stop executing the current job and begin executing another job with a higher priority rank. In another embodiment, updating the priority rank in real-time may comprise the production devices to finish executing the current job and then execute another job with a higher priority rank. In addition to processing jobs and/or batches based on priority, jobs and/or batches 614 may also be run in unison.

As represented by block 306, receiving one or more customer orders further comprises analyzing the one or more customer orders to identify batches 614 associated with the one or more orders 612, as shown in FIG. 7 and FIG. 8. To this extent, multiple orders may be processed at one time. For example, upon receiving the one or more orders 612, the order information may be grouped and stored in the database such that the information is later sorted. After sorting the information the system may easily identify like profiles associated with like species in each order. As such, components of each order that require the same species and profile may be manufactured as a single batch versus individually. To this extent the materials may be pulled, ripped, and moulded at once and then staged until other jobs associated with the orders have been completed. For example, Customer Smith may order seven (7) oak boards of profile A, five (5) cherry boards of profile B, three (3) oak boards of profile B, seven (7) maple boards of profile C, five (5) maple boards of profile B, four (4) oak boards of profile C, and six (6) maple boards of profile A. Likewise, Customer Miller may order four (4) oak boards of profile C, seven (7) oak boards of profile B, five (5) cherry boards of profile C, three (3) maple boards of profile B, six (6) oak boards of profile A, seven (7) maple boards of profile A, and two (2) maple boards of profile C. Customer Gonzales may order two (2) maple boards of profile B, five (5) cherry boards of profile B, four (4) oak boards of profile A, five (5) oak boards of profile C, five (5) cherry boards of profile C, seven (7) cherry boards of profile A, and three (3) maple boards of profile A. To this extent, the orders of customer Smith, Miller and Gonzales can be grouped into a single batch comprising seventeen (17) oak boards of profile A, three (3) oak boards of profile B, fifteen (15) oak boards of profile C and so forth such that each matching species/profile combination are grouped with one another into the single batch 614, thereby maximizing process efficiency and reducing waste.

As represented by block 308, in some embodiments, the system may also determine a production plan based at least partially on the order information. The production plan is created such that it optimizes the yield potential of the materials during manufacturing. The system may analyze all aspects of either each individual order, a plurality of orders 612, and/or one or more batches such that an optimal production plan is created. For example the system may determine a cut list that contains various sizes that may optimize yield production when processed together. The production plan may comprise specific details about manufacturing materials. Such details may include the type of materials to pull, the size of materials to pull, the order in which materials should be pulled, and a profile or tool associated with each material. Furthermore, the production plan may provide a template for coordinating tools 622 needed for each order with the tool room 605. The production plan may also include the quantity and size associated with each profile. As represented by block 310, after determining a production plan, job instructions may be created for one or more production devices based at least partially on the production plan. The job instructions may indicate one or more steps which a piece of machinery must execute in order to manufacture a job.

In various embodiments, one or more sub-steps shown in FIG. 4 are included in executing one or more jobs based at least partially on the job instructions. As represented by block 502, the production device(s) first execute one or more steps based at least partially on the job instructions received. In one embodiment, the production device is an inventory station 610 that includes a user interface associated with a fork lift and a supply 606 or inventory of lumber. The user interface may receive communication from the application server 106 providing instructions for the inventory station 610 operator to retrieve a plurality of materials from supply 606, as illustrated in FIGS. 5 and 9. In one embodiment, the one or more steps indicate that the operator should retrieve from inventory only materials that are needed for the current job.

In another embodiment, the production device 104 may be a rip saw 602, as illustrated in FIG. 11. The rip saw 602 infeed may receive instructions from the application server 106 indicating a quantity and size of each profile, as illustrated in FIG. 10. One or more steps included in the job instructions may be directed to moving blades on the rip saw 602. As such, the instructions may indicate an optimal position of the moving blades 618 (FIG. 13) such that the moving blades 618 are moved into the best solution for each board, as illustrated in FIG. 13. In one embodiment, as illustrated in FIG. 12, the rip saw 602 may rip one board for a strip to be associated with three distinct profiles and orders. Additionally, one or more steps included in the job instructions may prompt the rip saw 602 to stop ripping when it has finished the cut list. To this extent, the operator may focus more on identifying material defects versus managing the production device. One or more steps may instruct the rip saw 602 to rip to order, not to dimension. Furthermore, one or more instructions may be directed towards an ink-jet printer located at the out-feed of the rip saw 602.

In one embodiment, the ink-jet printer may comprise moving printer heads such that when instructed the moving printer head will adjust along with the saw blade allowing it to print information on each strip cut from the board, as illustrated in FIG. 14. In another embodiment, the printer may be located at the in-feed of the rip saw 602. Printed information may include, but not be limited to, profile name, size, and customer name. To this extent, each ripped strip may be dedicated to the moulding and customer it was ordered for such that each ripped strip is identified for a moulder 604 set-up. This further ensures stacks are made correctly when staging 608 materials.

In another embodiment, the production device 104 may be a user interface associated with a tool room 605. The user interface may receive communication from the application server 106 providing instructions to coordinate orders to the tool room 605. One or more instructions may indicate what jobs are needed, and when. One or more instructions may provide a list of tools 622 that are needed for the day's production. In another embodiment, the application server may communicate to the tool room 605 a list of what knives are currently available, and a list of knives that will be needed. As such, the tool room 605 may easily identify what knives they have and what knives are new from the list.

In yet another embodiment, the production device 104 may be a moulder, as illustrated in FIG. 17. The application server 106 may transfer job instructions and/or information to a set-up program associated with the moulder, as illustrated in FIG. 19. The application server 104 may also transfer job information to a user interface associated with the moulder 604, such that the operator is aware of what staged profile may be executed as the next job. One or more steps may indicate instructions for coordinating with the tool room 605 what tools 622 are needed for each order, as illustrated in FIG. 16. One or more steps may provide instructions pertaining to the cut-list such that the moulder 604 produces profiles and quantities according to the cut-list. One or more steps may indicate a real-time need for a profile change such that profile tooling may be changed within a matter of seconds upon receiving the instructions. This change may be affected by an operator receiving instructions for changing the tools in the moulder in order to be ready to run the next profile.

As represented by block 504, after executing a step the production device(s) may transfer job execution information to the application 106 such that a database associated with the application server 106 is also updated to reflect the current status of the job. In one embodiment, transferring job execution information may further comprise tallying the current orders for automated invoicing. For example, the fork lift operator may receive an instruction at the user interface of the inventory station 610 to retrieve several materials from inventory. After executing the steps involved, the user interface associated with the inventory station 610 may communicate with the application server 106 and indicate the required materials have been retrieved from inventory such that the inventory records stored at the application server 106 are immediately decremented to remove the materials retrieved from inventory. In this way, the inventory records of the application server 106 reflect the real-time status of the inventory. In another embodiment the rip saw 602 may measure the size of the board and transfer the information to the application server 106 such that the application server analyzes the information using optimizing software and sends updated instructions to the rip saw 602.

In another embodiment, after executing a one or more steps on a rip saw 602, the rip saw 602 may transfer job execution information to the application server 106 such that the application server communicates a real-time update of the job status to one or more other production device(s) 104. For example, the user interface associated with the tool room 605 may receive an update indicating the status of the cut-list such that they may prepare the tooling that will be needed prior to the cut-list being finished. In this way, both the material and tooling may be staged together and available when the moulder 604 is ready manufacture the related profile. This type of seamless communication provides an increase in efficiency at the moulder 604 and the system at large. In another embodiment, the moulder 604 may transfer job execution information to the application server 106 indicating the completion of a profile such that the moulder 604 may receive updated instructions. To this extent, the moulder 604 may change from one profile to the next with ease. In yet another embodiment after the profile has been run, and all cut-backs have been accounted for the moulder 604 may transmit job execution information to the application server such that a true tally may be created and compared to the original order. In one embodiment, this real-time information may be view on a user interface located at the out-feed of the moulder, as illustrated in FIG. 18. The real-time information may also be transmitted to the moulder 604 itself such that the moulder is aware of which profile is to be executed next. In one example, the moulder 604 transmit job execution information to the application server 106. In response, the application server 106 may create instruction to print packing slips, and the accounting office may view the packing list and create an invoice for the customer, as illustrated in FIG. 22.

As represented by block 508, every component of the system may query, at any time, the status of an order. For example, the user interface associated with the tool room 605 may request a real time update of the rip saw 602 so that the tool room 605 may begin to prepare tools 622 for pairing with the related profile and staging 608 to be presented to the moulder 604 in the next step of production, as illustrated in FIG. 15. To this extent, a plurality of machine statuses associated with machinery in the system may be visible on the production devices 104 themselves as well as the user computing device 108. This visibility can serve as an aid to decision making and active status coordination. Furthermore, the user 110 may activate an order in real-time such that the system component are immediately prompted to query the status of the order and receive updated instructions. In another embodiment, the system may query the cut-list such that only ordered items are sent to the rip saw 602 and moulder.

As will be appreciated by one skilled in the art, aspects of the present embodiments of the invention may be embodied as a system, method or computer program product. Thus, embodiments of the present invention are described below with reference to flowchart illustrations and/or block diagrams of methods, systems, and computer program products. Like numbers refer to like elements throughout. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

The steps and/or actions of a method or algorithm described in connection with the embodiments disclosed herein may be embodied directly in hardware, in a software module executed by a processor, or in a combination of the two. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module", "cell" or "system." Furthermore, aspects of the present embodiments of the invention may take the form of a computer program product embodied in one or more computer readable medium(s) having computer readable program code embodied thereon.

A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

If implemented in software, the functions may be stored or transmitted as one or more instructions or code on a computer-readable medium. Computer-readable media includes both computer storage media and communication media including any medium that facilitates transfer of a computer program from one place to another. Any combination of one or more computer readable medium(s) may be utilized. The computer readable medium may be a computer readable signal medium or a computer readable storage medium. A storage medium may be any available media that can be accessed by a computer. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

These computer program instructions may also be stored in a computer-readable medium that can direct a computer or other programmable data processing apparatus to function in a particular manner, such that the instructions stored in the computer readable memory produce an article of manufacture including instruction means which implement the function/act specified in the flowchart and/or block diagram block(s). Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

According to various embodiments of the invention, a computing device used by a user has a memory device configured to store computer-executable code and a processing device in communication with the memory device. The processing device is configured to execute computer-executable code stored on the memory device to communicate with one or more production interfaces, the one or more production interfaces associated with one or more mechanical devices and/or machinery used in the production process. In some embodiments, it also provides the user with options to activate, change, and/or prioritize orders that have been received. In some embodiments, it also provides the user information regarding the current status of one or more orders. In some embodiments, it also provides the user an option of seamlessly managing the production of one or more jobs associated with a plurality of orders 612.

According to some embodiments of the invention, a processing device of the computing device is configured to access a plurality of orders 612 stored in the memory device, and analyze each order to determine what is needed to produce the order and how the orders can be combined into one job that will optimize the resources and materials being used. In some such embodiments, the computing device also determines whether multiple orders can be combined into one batch or job. In some embodiments, it receives user input regarding priority rank of each order. In some embodiments, in response to receiving user input indicating a priority rank associated with one or more orders, the processing device may initiate an update of the job instructions related to manufacturing the one or more orders. In some of these embodiments, the production device(s) receives information associated with manufacturing materials. In some embodiments, the information is received from a bar code located on parts labeled for downstream tool assignments.

As used herein, a "memory device" or "memory" generally refers to a device or combination of devices including one or more forms of non-transitory computer-readable media for storing instructions, computer-executable code, and/or data thereon. Computer-readable media is defined in greater detail herein below. It will be appreciated that, as with the processing device, each communication interface and memory device may be made up of a single device or many separate devices that conceptually may be thought of as a single device.

Although embodiments of the invention described herein are generally described as involving a manufacturing entity, it will be understood that this invention may involve one or more persons, organizations, businesses, merchants and/or other institutions, services providers etc. that implement one or more steps, one or more processes, and/or one or more portions of one or more of the embodiments described and/or contemplated herein, and/or or one or more steps or processes not described herein.

While the foregoing disclosure discusses illustrative embodiments, it should be noted that various changes and modifications could be made herein without departing from the scope of the described aspects and/or embodiments as defined by the appended claims. Additionally, all or a portion of any embodiment may be utilized with all or a portion of any other embodiment, unless stated otherwise. Furthermore, while certain exemplary embodiments have been described and shown in the accompanying drawings, it is to be understood that such embodiments are merely illustrative of and not restrictive on the broad invention, and that this invention is not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

Although many embodiments of the invention have just been described above, the invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the invention described and/or contemplated herein may be included in any of the other embodiments of the invention described and/or contemplated herein, and/or vice versa. In addition, where possible, any terms expressed in the singular form herein are meant to also include the plural form and/or vice versa, unless explicitly stated otherwise.

What is claimed is:

1. A system for integrating processes used in the manufacturing of lineal moulding, the system comprising:
    a plurality of production devices that each perform at least one manufacturing process;
    a user computing device having a user interface to receive one or more customer orders; and
    a manufacturing application server operably connected to the plurality of production devices and the user computing device, the manufacturing application server comprising:
        a memory device storing computer executable code; and
        a processing device to execute the computer executable code to cause the processing device to:
            determine job instructions for at least one job, the job instructions based at least in part on the one or more received customer orders; and
            transfer some or all the job instructions to at least one of the plurality of production devices;
    wherein the user computing device is further to:
        receive priority rankings for each of the one or more customer orders and
        communicate some or all the priority rankings to the manufacturing application server; and
    wherein the plurality of production devices execute the job instructions to complete the at least one job.

2. The system of claim 1, wherein:
    the user computing device user interface receives order information, the order information associated with the one or more customer orders and communicates some or all the order information to the manufacturing application server.

3. The system of claim 2, wherein:
    the manufacturing application server processing device executes the computer executable code to cause the processing device to:
        identify batches associated with the one or more customer orders; and
        determine a production plan based at least in part on the order information, wherein the production plan optimizes yield potential of manufacturing materials.

4. The system of claim 1, wherein the job instructions are based at least in part on a production plan based at least in part on the order information and that optimizes yield potential of manufacturing materials.

5. The system of claim 1, wherein the production devices:
execute one or more processes in the manufacturing of lineal moulding based at least in part on the job instructions; and
communicate job execution information to the manufacturing application server.

6. The system of claim 5, wherein:
one of the production devices communicates a query to the manufacturing application server requesting a status update regarding one or more jobs; and
the manufacturing application server processing device executes the computer executable code to cause the processing device to:
receive the job execution information communicated from the plurality of production devices;
determine a status of the one or more jobs associated with the query based on the job execution information; and
communicate the status to the production device that communicated the query.

7. The system of claim 1, wherein the plurality production devices comprises an inventory station, a ripsaw, tool room or grinder, and a moulder.

8. A system for integrating processes used in the manufacturing of lineal moulding, the system comprising:
a plurality of production devices that each perform at least one manufacturing process; a user computing device having a user interface to receive one or more customer orders; and
a manufacturing application server operably connected to the plurality of production devices and the user computing device, the manufacturing application server comprising:
a memory device storing computer executable code; and
a processing device to execute the computer executable code to cause the processing device to:
determine job instructions for at least one job, the job instructions based at least in part on the one or more received customer orders;
transfer some or all the job instructions to at least one of the plurality of production devices;
identify batches associated with the one or more customer orders; and
determine a production plan based at least in part on the order information, and
wherein the production plan optimizes yield potential of manufacturing materials;
wherein the user computing device:
receives priority rankings for each of the one or more customer orders and
communicates some or all the priority rankings to the manufacturing application server; and
wherein the plurality of production devices execute the job instructions to complete the at least one job.

9. The system of claim 8, wherein the job instructions are based at least in part on a production plan based at least in part on the order information and that optimizes yield potential of manufacturing materials.

10. The system of claim 8, wherein the production devices:
execute one or more processes in the manufacturing of lineal moulding based at least in part on the job instructions; and
communicate job execution information to the manufacturing application server.

11. The system of claim 10, wherein:
one of the production devices communicates a query to the manufacturing application server requesting a status update regarding one or more jobs; and
the manufacturing application server processing device executes the computer executable code to cause the processing device to:
receive the job execution information communicated from the plurality of production devices;
determine a status of the one or more jobs associated with the query based on the job execution information; and
communicate the status to the production device that communicated the query.

12. The system of claim 8, wherein the plurality production devices comprises an inventory station, a ripsaw, tool room or grinder, and a moulder.

13. A system for integrating processes used in the manufacturing of lineal moulding, the system comprising:
a plurality of production devices that each perform at least one manufacturing process; a user computing device having a user interface to receive one or more customer orders; and
a manufacturing application server operably connected to the plurality of production devices and the user computing device, the manufacturing application server comprising:
a memory device storing computer executable code; and
a processing device to execute the computer executable code to cause the processing device to:
determine job instructions for at least one job, the job instructions based at least in part on the one or more received customer orders;
wherein the job instructions are based, at least in part, on a production plan based, at least in part, on the order information and that optimizes yield potential of manufacturing materials; and
transfer some or all the job instructions to at least one of the plurality of production devices;
wherein the plurality of production devices execute the job instructions to complete the at least one job.

14. The system of claim 13, wherein:
the user computing device user interface:
receives order information, wherein the order information is associated with the one or more customer orders; and
communicates some or all the order information to the manufacturing application server.

15. The system of claim 13, wherein the production devices:
execute one or more processes in the manufacturing of lineal moulding based at least in part on the job instructions; and
communicate job execution information to the manufacturing application server.

16. The system of claim 15, wherein:
one of the production devices communicates a query to the manufacturing application server requesting a status update regarding one or more jobs; and the manufacturing application server processing device executes the computer executable code to cause the processing device to:
  receive the job execution information communicated from the plurality of production devices;
  determine a status of the one or more jobs associated with the query based on the job execution information; and
  communicate the status to the production device that communicated the query.

17. The system of claim 13, wherein the plurality production devices comprises an inventory station, a ripsaw, tool room or grinder, and a moulder.

18. A system for integrating processes used in the manufacturing of lineal moulding, the system comprising:
  a plurality of production devices that each perform at least one manufacturing process; a user computing device having a user interface to receive one or more customer orders; and
  a manufacturing application server operably connected to the plurality of production devices and the user computing device, the manufacturing application server comprising:
    a memory device storing computer executable code; and
    a processing device to execute the computer executable code to cause the processing device to:
      determine job instructions for at least one job, the job instructions based at least in part on the one or more received customer orders; and
      transfer some or all the job instructions to at least one of the plurality of production devices;
      wherein the plurality of production devices:
        execute the job instructions to complete the at least one job;
        execute one or more processes in the manufacturing of lineal moulding based at least in part on the job instructions; and
        communicate job execution information to the manufacturing application server.

19. The system of claim 18, wherein:
the user computing device user interface:
  receives order information, wherein the order information is associated with the one or more customer orders; and
  communicates some or all the order information to the manufacturing application server.

20. The system of claim 18, wherein:
one of the production devices communicates a query to the manufacturing application server requesting a status update regarding one or more jobs; and
the manufacturing application server processing device executes the computer executable code to cause the processing device to:
  receive the job execution information communicated from the plurality of production devices;
  determine a status of the one or more jobs associated with the query based on the job execution information; and
  communicate the status to the production device that communicated the query.

21. The system of claim 18, wherein the plurality production devices comprises an inventory station, a ripsaw, tool room or grinder, and a moulder.

22. A system for integrating processes used in the manufacturing of lineal moulding, the system comprising:
  a plurality of production devices that each perform at least one manufacturing process;
  a user computing device having a user interface to receive one or more customer orders; and
  a manufacturing application server operably connected to the plurality of production devices and the user computing device, the manufacturing application server comprising:
    a memory device storing computer executable code; and
    a processing device to execute the computer executable code to cause the processing device to:
      determine job instructions for at least one job, the job instructions based at least in part on the one or more received customer orders; and
      transfer some or all the job instructions to at least one of the plurality of production devices;
      wherein the plurality of production devices execute the job instructions to complete the at least one job, and
      wherein the plurality production devices comprise an inventory station, a ripsaw, tool room or grinder, and a moulder.

23. The system of claim 22, wherein:
the user computing device user interface:
  receives order information, wherein the order information is associated with the one or more customer orders; and
  communicates some or all the order information to the manufacturing application server.

24. The system of claim 22, wherein the production devices:
  execute one or more processes in the manufacturing of lineal moulding based at least in part on the job instructions; and
  communicate job execution information to the manufacturing application server; and
wherein:
one of the production devices communicates a query to the manufacturing application server requesting a status update regarding one or more jobs; and
the manufacturing application server processing device executes the computer executable code to cause the processing device to:
  receive the job execution information communicated from the plurality of production devices;
  determine a status of the one or more jobs associated with the query based on the job execution information; and
  communicate the status to the production device that communicated the query.

* * * * *